United States Patent
Levinson et al.

(10) Patent No.: US 12,243,002 B1
(45) Date of Patent: Mar. 4, 2025

(54) FLEET MANAGEMENT FOR PROVIDING GOODS TO PEDESTRIANS

(71) Applicant: Zoox, Inc., Foster City, CA (US)

(72) Inventors: Jesse Sol Levinson, Hillsborough, CA (US); Daniel Earl Meyer, Hayward, CA (US); Valmiki Satya Rampersad, Hayward, CA (US)

(73) Assignee: Zoox, Inc., Foster City, CA (US)

( * ) Notice: Subject to any disclaimer, the term of this patent is extended or adjusted under 35 U.S.C. 154(b) by 246 days.

(21) Appl. No.: 17/993,698

(22) Filed: Nov. 23, 2022

(51) Int. Cl.
*G06Q 10/08* (2024.01)
*G06Q 10/083* (2023.01)
*G06Q 10/0835* (2023.01)
*G06Q 30/0202* (2023.01)

(52) U.S. Cl.
CPC ... *G06Q 10/08355* (2013.01); *G06Q 10/0838* (2013.01); *G06Q 30/0202* (2013.01)

(58) Field of Classification Search
CPC ..................................................... G06Q 10/08
USPC ........................................................ 705/7.31
See application file for complete search history.

(56) References Cited

U.S. PATENT DOCUMENTS

| | | | |
|---|---|---|---|
| 10,915,762 B1* | 2/2021 | Russell | G06V 40/103 |
| 11,222,299 B1* | 1/2022 | Baalke | G01C 21/3691 |
| 2020/0226667 A1* | 7/2020 | Kalaimani | G10L 15/183 |
| 2022/0044572 A1* | 2/2022 | Sakurada | B60W 50/0097 |
| 2023/0264716 A1* | 8/2023 | Zhou | G01C 21/3461 |
| | | | 701/25 |
| 2023/0368128 A1* | 11/2023 | Rule | G06Q 30/0635 |

* cited by examiner

*Primary Examiner* — Nga B Nguyen
(74) *Attorney, Agent, or Firm* — Lee & Hayes, P.C.

(57) ABSTRACT

Techniques for item delivery and delivery systems including autonomous delivery vehicles used to identify optimal delivery locations and/or deliver physical items to pedestrians is discussed herein. In some examples, a fleet management system may receive sensor data captured from sensor devices of vehicles of a fleet of vehicles while traversing within an environment. The fleet management system may use the sensor data to identify region(s) of the environment within which a threshold number of pedestrians may be located. Based on identifying a region having a threshold number of pedestrians, the fleet management system may determine how many vehicles of the fleet of vehicles are available to render delivery services to the pedestrians within the region. In some examples, the fleet management system may identify an available vehicle of the fleet of vehicles to which instructions may be sent. Such instructions may include transporting items to pedestrians within the region.

20 Claims, 16 Drawing Sheets

200 ⤴

212

200 ↴

FLEET MANAGEMENT FOR PROVIDING GOODS TO PEDESTRIANS

BACKGROUND

Delivery services, such as food trucks and ice cream trucks, may provide goods or services to people within an environment. In order to deliver such goods, a delivery service may maintain a fleet of delivery vehicles with drivers that follow delivery routes to distribute the goods. However, in many cases, such routes may not be optimal and can lead to wasted selling efforts.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
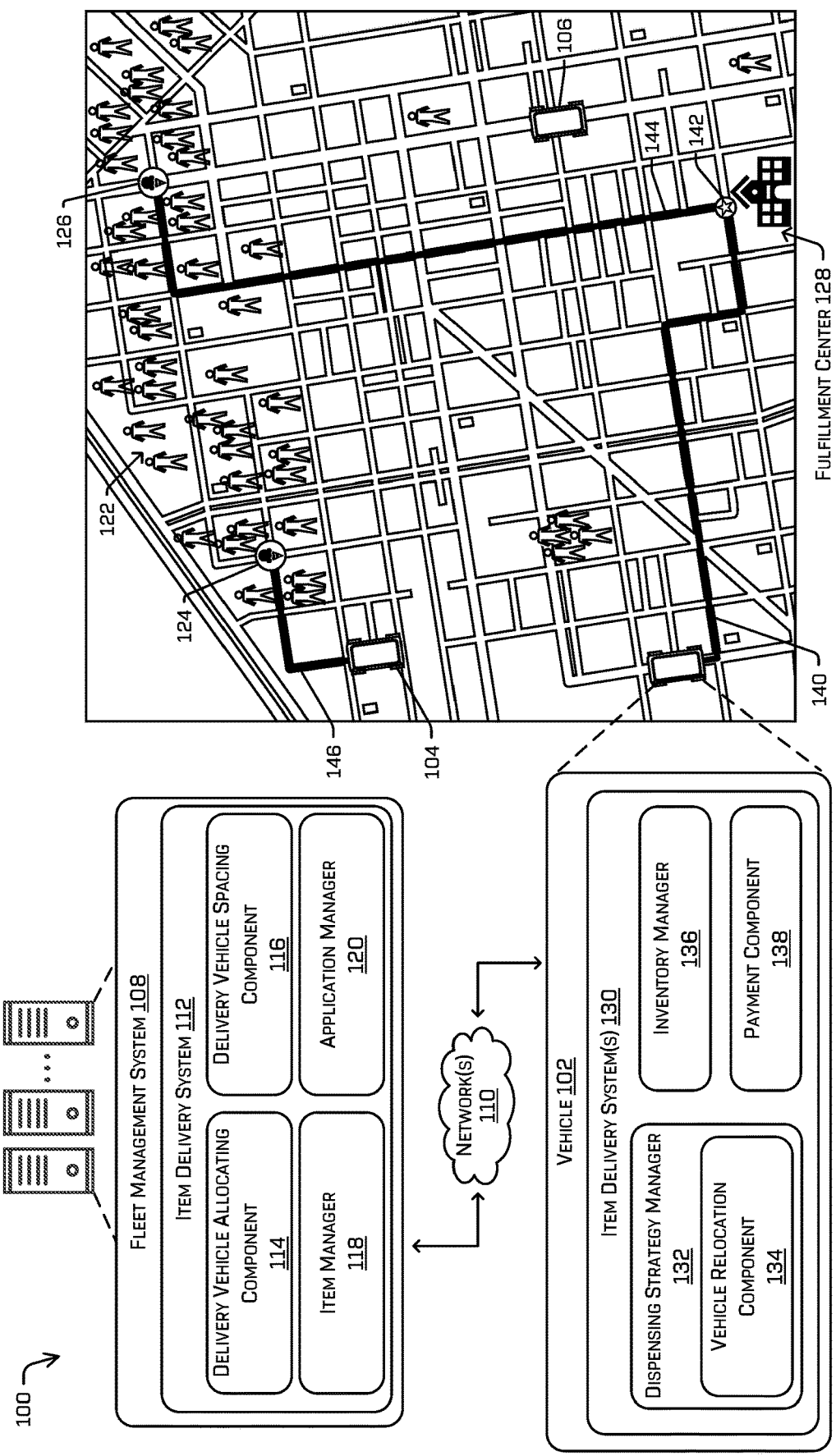
FIG. 1 illustrates and example environment with delivery vehicles being managed by an example fleet management system, in accordance with one or more examples of the disclosure.

The techniques discussed herein may relate to delivery systems including autonomous delivery vehicles used to identify optimal delivery routes to deliver physical items and/or services to pedestrians or other customers. Autonomous delivery robots (which may also be referred to as delivery vehicles) may include storage units (e.g., refrigerator, freezers, lockers, ice cream machines, etc.) to store goods and other items for delivery to customers within an environment. In some examples, a fleet management system may receive sensor data captured from sensor devices of vehicles of a fleet of vehicles while traversing within a driving environment. The fleet management system may use the sensor data and/or other data to identify region(s) of the environment within which a threshold number of customers (e.g., pedestrians) may be located. Based on identifying a region having a threshold number of customers, the fleet management system may determine how many vehicles of the fleet of vehicles are available to render delivery services to the customers within the region. In such instances, vehicles available for delivery service may include vehicles that may be transitioned from a taxi service vehicle to a delivery service vehicle. Determining the number of available delivery vehicles may be based on comparing the predicted demand for taxi service vehicles within the region with the predicted demand for delivery service vehicles within the region. In some examples, the fleet management system may identify a vehicle of the fleet of vehicles to which instructions may be sent. Such instructions may include transitioning the vehicle from a taxi service vehicle to a delivery service vehicle, causing the vehicle to retrieve a quantity of items for delivery from a fulfillment center, and/or transporting the quantity of items to customers within the region.

In some examples, the vehicle may receive the instructions from the fleet management system, though in other examples the vehicle may additionally or alternatively receive instructions from a distributor, merchant, or other entity. In some examples, the vehicle may independently determine to transition from a taxi service to a delivery service mode of operation. Regardless of the source of the instructions, the vehicle may determine that the instructions cause the vehicle to deliver a quantity of goods to a specified region within the environment. Based on the instructions, the vehicle may transition to a delivery service vehicle (e.g., if not already a delivery service vehicle) and navigate to the region. Transitioning to a delivery service vehicle may include retrieving a quantity of items from a fulfilment center, physically reconfiguring the vehicle (e.g., removing, repositioning, or reconfiguring passenger seats, adding a dispenser or storage unit to hold and/or dispense items, or other physical modifications to the vehicle), and/or changing an operating mode of the vehicle. Changing an operating mode of the vehicle, if performed, may including changing one or more operating parameters of the vehicle. In some examples, upon arriving at and/or within the region, the vehicle may receive sensor data (e.g., captured within a threshold time frame) captured from sensor devices of the vehicle. Such sensor data and/or other data (e.g., signals from user applications) may be used to detect a plurality of customers within the region. Based on identifying the plurality of customers within the region, the vehicle may determine a dispensing strategy. Such a dispensing strategy may describe how the vehicle may deliver the goods to the plurality of customers within the region. In some examples, the vehicle may deliver the goods to the plurality of customers within the region according to the dispensing strategy. As discussed throughout this disclosure, the techniques may improve systems and processes for delivery of physical items and/or services to customers by improving delivery efficiency and effectiveness by utilizing real-time sensor data from a fleet of vehicles and/or historical data of the region to locate and provide items to customers within the region. In some instances, such techniques allow the vehicle to perform more efficient delivery services.

As described above, delivery routes may lead to an inefficient and ineffective delivery service. For example, delivery vehicles may be configured to deliver various types of items, such as ice cream, beverages, and/or food, among other things. In such instances, drivers of the delivery vehicles must determine a location at which to sell such items. However, drivers may not know if customers are currently, or predicted to be, in such locations. Further, upon arriving to a particular location within the environment, the human drivers may be unaware of better delivery locations because they don't have a knowledge of the whole environment; rather, human drivers have knowledge of the customer population in their immediate region (e.g., within the driver's eyesight). Consequently, drivers of delivery vehicles many spend excessive time navigating the environment trying to identify potential locations to sell their items. Further, even if the driver guesses correctly and finds a location with a large number of potential customers, the driver still has no idea if the potential customers actually want or need the items that she or he has to sell. Accordingly, manually determining delivery locations within an environment can be time-consuming, inefficient, and ineffective.

To address these technical problems and inefficiencies, the techniques described herein may include using one or more item delivery systems to identify optimal delivery locations for delivery of physical items to customers. Further, such item delivery systems may leverage real-time sensor data captured from a fleet of vehicles to enable a fleet manager to route and/or re-route delivery vehicles to regions of the environment with the highest likelihood of delivery opportunities. Technical solutions discussed herein solve technical problems associated with determining delivery locations based on outdated information and inefficient techniques.

Initially, a fleet management system (hereinafter referred to as a "fleet manager") may be configured to deploy and manage a fleet of vehicles. The fleet manager may deploy and/or manage any number of vehicles. Such vehicles may be designed and/or configured as taxi service vehicles, delivery service vehicles, and/or other vehicles. Further, vehicles of the fleet of vehicles may be transitioned from taxi service vehicles to delivery service vehicles and/or from delivery service vehicles to taxi service vehicles. In some examples, the fleet manager may deploy and/or manage a fleet of vehicles covering (e.g., servicing) a specified portion of the environment (e.g., one or more streets, one or more neighborhoods, one or more cities, one or more states, one or more countries, etc.).

In some examples, the delivery vehicles used in the examples discussed herein may include various configurations of storage units, dispensers, and other features to support deliveries of different item sizes, shapes, and transportation requirements. In some examples, delivery vehicles may include storage units configured to store and transport various types of items such as ice cream, beverages, umbrellas, medicine, tools, etc., to name just a few non-limiting examples. In such instances, depending on the types of items to be delivered, the storage unit may be a refrigerator or freezer for storing and transporting perishable or meltable items. Further, the storage unit may be a cargo space for storing and transporting larger items. In yet other examples, the storage unit may include an ice cream machine configured to dispense various types of ice cream to customers within an environment. In some examples, the storage units may have self-actuating doors, pressure/weight sensors, cameras, and/or other sensors to detect removal of items from the particular storage unit. Security and privacy features integrated within the delivery vehicle and/or the storage units may allow customers to obtain delivered items, as well as preventing unauthorized access and tampering. In some examples, a storage unit may be constructed as a modular storage cassette which is attachable and detachable to the vehicle to facilitate loading and unloading items from the storage unit. In other examples, such storage units may be attached in and around vehicle seating and may use at least a portion of the vehicle seating compartment.

In some examples, the fleet manager may initiate delivery processes for vehicles of the fleet of vehicles. The fleet manager may initiate delivery processes based on various factors, such as utilizing historical data (e.g., historical pedestrian density within regions of the environment, previous sales within regions of the environment, etc.), receiving sensor data from vehicles within the fleet, and/or receiving user input provided via mobile applications. In at least some examples, such initiation may be based on current positions of the vehicles in the fleet and may be modified from time to time (e.g., over the course of the day) as will be discussed in detail herein.

The fleet manager may initiate delivery processes based on receiving sensor data from vehicles (e.g., taxi service vehicles and/or delivery service vehicles) within the fleet of vehicles as vehicles traverse the environment. In some instances, the sensor data may provide a recent representation (e.g., captured within a threshold period of time (e.g., within 4 hours, 2 hours, 1 hour, 30 minutes, 15 minutes, 1 minute, etc.)) of the environment. As such, based on receiving sensor data from numerous vehicles within the fleet of vehicles, the fleet manager may receive sensor data associated with numerous locations and/or regions of the environment.

Additionally or alternatively, the fleet manager may initiate delivery processes based on receiving user input from mobile applications. In some examples, mobile applications may include applications associated with the vehicle (e.g., a ride sharing application, a delivery application, a shipping application, etc.), applications associated with purchasing one or more items (e.g., an item delivery application, a merchant application, a shopping application, etc.), or another application (e.g., a social networking application, a messaging application, etc.). The fleet manager may receive user input from the application requesting the delivery of (or an indication of interest in potentially receiving) particular types of items/services. For example, customers within the environment may use a mobile application to request the delivery of an item (e.g., ice cream, beverages, etc.). Further, in other such examples, customers may respond to polling facilitated via the mobile application. Such polling may ask customers if they would like an item to be delivered to a region of the environment. In still other examples, users may provide input by expressing interest in one or more items or types of items (e.g., by posting, liking, commenting, sharing, or otherwise expressing interest via an application such as a social networking application). In such examples, the fleet manager may receive the user input provided to the mobile application. In at least some such examples, various attributes associated with a user account may be used when an indication of interest is received (e.g., a predefined preferred area for delivery, a home address, etc.).

In some examples, the fleet manager may determine one or more region(s) within the environment to deliver items and/or a route between multiple regions. The fleet manager may determine the region(s) based on historical data, user input from the mobile application, and/or evaluating the sensor data to detect customers within the environment. For example, user responses made to a mobile application may include desired delivery locations. As such, the fleet manager may utilize the desired delivery locations in order to determine the region. Further, in examples in which the users have opted in or granted permission to share their locations, the fleet manager may use user location data obtained from geolocating users that are using the mobile application and/or responded or requested the delivery of items. In other examples, the fleet manager may determine the region by analyzing and/or evaluating the received sensor data to detect customers within the environment. In such instances, the fleet manager may identify one or more regions within the environment that have a threshold number and/or density of customers. In such instances, the threshold may be determined based on a number of different factors, such as location data, historical data, and/or forecast data. Furthermore, the fleet manager may use such sensor data to determine and/or generate heat maps identifying and/or indicating characteristics of pedestrians within an environment. Example techniques for generating heatmaps to identify and predict pedestrian behavior can be found, for example, in U.S. Pat. No. 11,055,624, filed Nov. 8, 2017, and titled "Probabilistic Heat Maps For Behavior Prediction" the contents of which is herein incorporated by reference in its entirety and for all purposes.

In some examples, location data may include the type of city (e.g., small town, large metropolitan city, etc.) from which the sensor data was captured, the types of travel used in the region (e.g., public transportation, personal vehicles, one-way roads, freeways, etc.), etc. In some examples, historical data may include a density of customers within the region, a number of customers within the region, a pattern of traffic for the time of day within the region, a pattern of traffic for the time of week within the region, a number of previous sales within the region, an amount of mobile application use within the region, etc. In some examples, forecast data may include current weather within the region, predicted weather within the region, event data (e.g., known events within the region such as sporting events, concerts, festivals, performances, holidays, road work, road closures, or other scheduled events), etc.

In at least some examples, such user data may be combined with sensor data from the fleet for determining optimal regions, routes, locations, etc. As a non-limiting example of such, sensor data from a fleet of vehicles may be compared with user interest data. If user interest data substantially correlates with observed sensor data, the locations may be confirmed. Otherwise, the routes, regions, locations, etc. may be altered based on a combination of observations and requests while potentially weighting observations more or less in various examples.

Based on identifying a region of the environment that has a threshold number of customers (and/or a likelihood of the threshold number), the fleet manager may determine how many vehicles of the fleet of vehicles are available to render a delivery service to customers within the region. In some examples, the fleet manager may determine a number of vehicles available for delivery service based on comparing a predicted demand for taxi services within the region with a predicted demand for delivery services within the region. In such instances, the predicted demand may be based on the amount of money the particular service (e.g., taxi service, delivery service, etc.) is estimated to make within a threshold period of time (e.g., one hour, two hours, six hours, 24 hours, etc.). Such determinations may be based on historical data for the region, sensor data from the region, and/or forecast data for the region. For example, the fleet manager may determine that the historical data indicates that ice cream has particularly high sales within this region, and that the sensor data indicates that a large number of people are outside; however, the fleet manager may determine that the forecast data indicates that cold weather is predicted to be within the region in an hour. In such circumstances, the fleet manager may determine to allocate a small number of vehicles for delivery service, as it will likely not experience the same demand as the taxi service. However, this example is not intended to be limiting, the fleet manager may allocate more or less vehicles in such situations. In various such examples, statistical or machine learning techniques may be used to correlate one or more environmental conditions with sales based on delivered regions such that the fleet manager may learn how environmental conditions may impact sales and modify delivery accordingly.

In some examples, the fleet manager may determine an item to deliver to the customers within the region. The fleet manager may determine one or more varieties of items to deliver to customers within the region. Such items may include ice cream, beverages (e.g., water, soda, etc.), ice, umbrellas, candy, snacks, food, medicine, clothing, tools, first aid equipment, and/or any other items. In some instances, determining an item to deliver may be based on the fleet manager evaluating historical data, sensor data, forecast data, user responses from mobile applications, and/or other datasets. The fleet manager may select one or more items to deliver which may be predicted to yield the greatest number of sales and/or profits. For example, the fleet manager may determine that user responses from mobile applications have requested ice cream, the forecast data indicates that the weather will be sunny and hot, the sensor data indicates that there are a large number of customers within the region, and/or the historical data indicates that in similar circumstances the vehicle sold large number of ice cream cartons. Accordingly, the fleet manager may weigh some or all of the factors to determine the item(s) and/or quantity each item to deliver.

Based on having determined an item(s) and quantities to deliver, the fleet manager may determine one or more vehicles of the fleet of vehicles to deliver the items to customers within the region. The fleet manager may select any number of available vehicles of the fleet to deliver the items to the region. In some instances, determining which vehicles to commit to delivery, and how many vehicles to commit to delivery, may be based on a number of factors, such as the vehicle's proximity to the region and/or the fulfilment center, the vehicle's current service type (e.g., taxi service vehicle or delivery service vehicle), the vehicle's remaining power compared with the estimated delivery time, and/or other factors. In such examples, if the potential vehicle is a delivery service vehicle, the fleet manager may identify the item currently stocked within the vehicle, the quantity of the stocked item, and/or other considerations. If the potential vehicle is a taxi service vehicle, the fleet manager may determine the vehicle's status (e.g., currently providing ride to user, in-route to pick up user, waiting for ride request, etc.). Based on such factors, the fleet manager may weigh some or all of the above listed factors and may select one or more vehicles to deliver the items to customers within the region.

In some examples, the fleet manager may send instructions to the selected vehicle(s) to transport items to the customers within the region. Instructions may differ based on a number of different factors. For example, if the selected vehicle is a taxi service vehicle, the instructions may include instructions to navigate to a fulfillment center to retrieve a quantity of the item, receive a particular type of dispenser or storage unit within which the items may be stored, and/or navigate to the region to deliver the items. In other examples, if the selected vehicle is a delivery service vehicle, the instructions may include instructions to navigate to a fulfillment center to retrieve a quantity of the item (e.g., based on the vehicle having a different item or based on the vehicle having a low inventory of the desired item) and navigate to the region for delivery. In some instances, the instructions may provide a specific location within the region to which the vehicle may navigate and dispense (e.g., sell) the items. In other examples, the instructions may provide a general location within the region to which the vehicle may navigate. In such examples, upon arriving at the general location, the vehicle may determine a dispensing strategy that includes a specific location and/or route to deliver the items.

In some examples, the fleet manager may dynamically update the allocation of delivery vehicles associated with the region. In some instances, the fleet manager can allocate additional vehicles to deliver items to customers within the region based on comparing the inventory of delivery vehicles and the remaining predicted demand. In other examples, additional delivery vehicles may be allocated to the region based on customer wait times meeting or exceeding a threshold wait time. In some instances, the fleet manager may receive information from a delivery vehicle that the vehicle has below a threshold quantity of items remaining within the storage unit. The fleet manager may determine a predicted demand for the item within the region based on sensor data from the vehicle and/or user input from the mobile application (e.g., continued item requests). In some instances, the fleet manager may compare the quantity of items remaining with the predicted demand. If the predicted demand meets or exceeds a threshold level of difference (e.g., there is far more remaining purchasers compared to the available inventory), the fleet manager may send instructions to additional vehicles of the fleet of vehicles to transition to a delivery vehicle and transport additional quantity of items to customers within the region. In other examples, the fleet manager may send instructions to the delivery vehicle instructing the delivery vehicle to return to the fulfillment center to restock with additional quantity of the items.

In some examples, the vehicle may receive the instructions from the fleet manager to deliver items to customers within the environment. As described above, if the vehicle was previously a delivery vehicle, the instructions may include instructing the vehicle to navigate directly to the region. If the vehicle was previously a taxi service vehicle, the instructions may include instructing the vehicle to transition to a delivery service vehicle. Transitioning to a delivery service vehicle may include navigating to a fulfillment center to retrieve the items, physically reconfiguring the vehicle (e.g., removing, repositioning, or reconfiguring passenger seats, adding a dispenser or storage unit to hold and/or dispense items, or other physical modifications to the vehicle), and/or changing an operating mode of the vehicle. Changing an operating mode of the vehicle may include changing one or more operating parameters of the vehicle. For example, changing the operating mode of the vehicle may include changing operating constraints, such as the vehicle's maximum speed, maximum acceleration, cabin temperature, vehicle height (e.g., distance from the ground surface to the bottom of the vehicle), etc. In such examples, changing the operating constraints may depend on the type of item to be sold. Further, changing the operating mode of the vehicle may include changing the lighting and sound operations (e.g., flashing lights, advertisements, ice cream songs, etc.). Changing the operating mode of the vehicle may also include changing the region within which the vehicle is permitted to operate, in addition to changing path planning strategy (e.g., slow down when passing groups of potential customers, stay in the right lane so as to be able to pull over more easily, etc.).

Upon arriving to and/or within the region, the vehicle may receive sensor data of the environment. The vehicle may include multiple sensor devices configured to receive unique sensor data representative of the perspective of the sensor device. Such sensor devices may include radar devices, lidar devices, image capturing devices, time-of-flight devices, etc. In such instances, the sensor data may be captured within a threshold period of time (e.g., 1 second, 5 seconds, 1 minute, 10 minutes, etc.). In some examples, the vehicle may detect and locate groups and/or groupings of customers within the region based on the sensor data.

Based on determining the location(s) of a group of customers within the region, the vehicle may determine a dispensing strategy. In some examples, the vehicle may determine a dispensing strategy describing how the vehicle may deliver the goods to the plurality of customers within the region. In such instances, the dispensing strategy may be based on a number of factors including historical data for the region, forecast data, and/or region characteristic data. Such region characteristic data may include location information (e.g., city type, type of travel within the region (e.g., public transportation, one-way streets, etc.)), customer density, customer movement (e.g., where and how customers are moving), parking locations, parking fees, zoning regulations, local laws (e.g., traffic laws, law regarding vending of items, etc.), customer safety, etc. The vehicle may analyze such data to determine the dispensing strategy. In determining the dispensing strategy, the vehicle may consider whether to deliver the items from a fixed location or while driving around the region. Further, the vehicle may also consider targeting specific customers. For example, the vehicle may identify customers with the item, and customers without the item. In such examples, if the delivery item is ice cream, the vehicle may use sensor data to identify customers in the region that already have ice cream and customers in the region without ice cream. In such instances, the vehicle may target the customers that do not already have the ice cream. Targeting such customers may include relocating the vehicle proximate the customers, emitting lights toward the customers, and/or outputting directed audio towards the customers that do not already have the item. In some examples, the vehicle may execute the dispensing strategy.

In some examples, the vehicle may update the dispensing strategy. In some examples, the decision to update the dispensing strategy may be made by the vehicle, while in other examples the decision can be made by the fleet management service or other computing device. Updating the dispensing strategy may include causing the vehicle to relocate to a different location within the region, navigating to a fulfillment center to restock with additional quantity of the item, transitioning from a delivery service vehicle to a taxi service vehicle, modifying the height of the vehicle (e.g., distance from the ground surface to the bottom of the vehicle), etc. The vehicle or other computing device may determine an updated dispensing strategy based on a variety of factors such as, changes in the groups of customers (e.g., customers are moving around the region), changes in parking (e.g., better parking has become available, parking fees have changed), remaining inventory has gone below a threshold level, sales have gone below a threshold level, remaining number of customers in line and/or waiting to purchase the item, etc. In some examples, the vehicle may execute the updated dispensing strategy.

In some examples, the vehicle may receive payment from customers within the region in exchange for the item. For example, a customer may obtain one or more items from the vehicle's stock of items based on providing payment for the item(s). Customers may provide payment via a mobile application or via an interactive surface of the vehicle. For example, a customer may purchase the item via a mobile application associated with the vehicle. In some examples, the customers may receive the item for free in exchange for downloading and installing the mobile application and/or for signing up for a service (e.g., a ride sharing service). Alternatively or additionally, a customer may order and/or pay for items via an interactive surface of the vehicle.

As illustrated by these examples, the techniques described herein can improve systems and processes of the autonomous and semi-autonomous vehicles operating in various driving environments for delivery of physical items to customers in several ways. For example, item delivery systems including autonomous delivery vehicles may improve delivery efficiency and effectiveness by using real-time sensor data to obtain an accurate representation of the environment, in addition to obtaining locations of customers within the environment. Further, based on the fleet manager receiving sensor data from numerous vehicles spread across a region, the fleet manager may have an accurate representation of a larger region.

The techniques described herein can be implemented in a number of ways. Example implementations are provided below with reference to the following figures. Example implementations are discussed below in which the delivery vehicles are implemented as autonomous vehicles. However, the methods, apparatuses, and systems described herein can be applied to fully or partially autonomous delivery vehicles, robots, and/or robotic systems and are not limited to autonomous vehicles. Moreover, at least some of the techniques described herein may be utilized with driver-controlled vehicles. Also, while examples are given with respect to land vehicles (e.g., cars, vans, trucks, or other wheeled or tracked vehicles), the techniques can also be utilized in an aviation or nautical contexts. Further, while described in the context of the provision of goods, such description is for illustrative purposes and the description is not meant to be so limiting. Of course, any good, service, or combination thereof is contemplated and the corresponding description may be modified accordingly. Also, while examples are given in which the customers are pedestrians, customers are not limited to pedestrians and can include people in vehicles, on bikes, inside buildings, and potentially even non-human customers (e.g., other vehicles or robots).

FIG. 1 illustrates and example environment 100 with delivery vehicles being managed by an example fleet management system.

As illustrated in FIG. 1, the example environment 100 may include multiple vehicles. Specifically, the example environment 100 may include a first vehicle 102, a second vehicle 104, and a third vehicle 106. In some examples, some or all of the vehicles may be autonomous vehicles. In some examples, the first vehicle 102, the second vehicle 104, and the third vehicle 106 may be taxi service vehicles or a delivery service vehicles. Taxi service vehicles may operate within the example environment 100 to provide pedestrians transportation from a starting location to a destination. Delivery service vehicles may operate within the example environment 100 to deliver items to pedestrians in various locations.

In some examples, the vehicles may be deployed and/or managed by a fleet management system 108. In some examples, the fleet management system 108 may be a component integrated as a separate server-based system. However, in other examples, the fleet management system 108 may be integrated within systems of the vehicles. In some examples, the vehicles may send data to the fleet management system 108 and receive data from the fleet management system 108 through a network(s) 110.

In some examples, the fleet management system 108 may deploy and manage any number of vehicles including, but not limited to, coordinating pick up and drop off requests from future passengers, providing location data for provision of services or deliver of goods, providing suggested routes to individual vehicles in the fleet of vehicles, etc. In this example, the fleet management system 108 may manage the actions of the first vehicle 102, the second vehicle 104, and the third vehicle 106 (e.g., the fleet of vehicles). In some examples, the fleet management system 108 may manage a fleet of vehicles covering a specified portion of the environment. In some examples, the fleet management system 108 may dynamically control vehicle activities by transitioning the vehicles from taxi service vehicles to delivery service vehicles and/or delivery service vehicles to taxi service vehicles.

In some examples, the fleet management system 108 may include various components described below, configured to perform different functionalities of an item delivery service technique. For instance, the fleet management system 108 may include an item delivery system 112 configured to determine an optimal delivery strategy for vehicles within the fleet of vehicles. The item delivery system 112 may include a delivery vehicle allocating component 114 configured to determine when and how many delivery vehicles to allocate for delivery within a specified region, a delivery vehicle spacing component 116 configured to determine optimal spacing between delivery vehicles within a region, an item manager 118 configured to manage inventory for delivery vehicles, and/or an application manager 120 configured to determine vehicle actions based on user input to mobile applications.

In some examples, the item delivery system 112 may include a delivery vehicle allocating component 114 configured to determine when to allocate and re-allocate vehicles to delivery service within a specified region. The delivery vehicle allocating component 114 may control which vehicles are functioning as taxi service vehicles and which vehicles are functioning as delivery service vehicles.

In some examples, the delivery vehicle allocating component 114 may allocated delivery vehicles based on initiating delivery processes. The delivery vehicle allocating component 114 may initiate delivery processes based on receiving sensor data from the vehicles within the fleet and/or receiving user input provided via mobile applications.

The delivery vehicle allocating component 114 may initiate delivery processes based on receiving sensor data from vehicles within the fleet of vehicles as vehicles traverse the example environment 100. In some instances, the sensor data may provide a recent representation (e.g., captured within a threshold period of time) of the environment. In this example, the delivery vehicle allocating component 114 may receive sensor data from the first vehicle 102, the second vehicle 104, and the third vehicle 106 as such vehicles navigate throughout the example environment 100. In such instances, the received sensor data from each of the vehicles may provide the delivery vehicle allocating component 114 a current (e.g., or near current) representation of the pedestrian activity within numerous locations and/or regions of the environment surrounding the vehicles. In this example, the delivery vehicle allocating component 114 may receive sensor data from the second vehicle 104 which may illustrate numerous pedestrians congregating within a region of the example environment 100.

The delivery vehicle allocating component 114 may alternatively or additionally initiate delivery processes based on receiving user input from mobile applications. Mobile applications may include applications associated with the vehicle (e.g., vehicle application). In some examples, the delivery vehicle allocating component 114 may interact (e.g., communicate) with the application manager 120 to determine whether to allocate delivery vehicles to a particular region of the environment. As shown in FIG. 1, the delivery vehicle allocating component 114 and the application manager 120 are two separate components; however, in other examples such components may be a single component.

As described above, the item delivery system 112 may include an application manager 120 configured to determine vehicle actions based on user input to mobile applications. In some examples, the application manager 120 may receive user input from the application requesting the delivery of items. For example, pedestrians within the environment may use a mobile application associated with the vehicle to request the delivery of an item (e.g., ice cream, beverages, umbrellas, medicine, etc.). Further, in other such examples, pedestrians may respond to polling facilitated via the mobile application. Such polling may ask pedestrians if they would like an item to be delivered to a region of the environment. In such examples, the application manager 120 may receive the user input provided to the mobile application. In this example, the example environment 100 may include multiple pedestrians 122. The multiple pedestrians 122 may access a mobile application and request an item be delivered to a particular location. In this instance, the application manager 120 may receive the requests from the multiple pedestrians 122. Additional detail about user requests via the mobile application is described below in FIG. 8.

In some examples, the delivery vehicle allocating component 114 may determine one or more regions within the environment to deliver items. The delivery vehicle allocating component 114 may determine the region based on user input from the mobile application and/or evaluating the sensor data to detect pedestrians within the environment. In some such examples, the regions may be determined based at least in part on a number of items the vehicle is able to carry, the number of persons detected and/or showing interest for the item at a particular location, etc. For example, user responses received by the application manager 120 may include desired delivery locations. As such, the delivery vehicle allocating component 114 may utilize the desired delivery locations in order to determine the delivery regions. Further, in examples in which the users have opted in or granted permission to share their locations, the application manager 120 may use user location data obtained from geolocating users that are using the mobile application and/or responded or requested the delivery of items, have a history of purchase of such good or service (based on previous direct sales, internet sales made available to the fleet manager, etc.), or otherwise. In this example, the application manager 120 may identify the locations of the multiple pedestrians 122 which have used the mobile application within a threshold period of time. In such situations, the application manager 120 may receive accurate locations for the multiple pedestrians 122. In other examples, the delivery vehicle allocating component 114 may determine the region based analyzing and/or evaluating the received sensor data to detect pedestrians within the environment. In such instances, the delivery vehicle allocating component 114 may identify one or more regions within the environment that have a threshold number of pedestrians. In such instances, the threshold may be determined based on a number of different factors, such as location data, historical data (e.g., past sales success associated with the location, past recorded sales associated with the particular pedestrians, etc.), and/or forecast data as described below. For example, the delivery vehicle allocating component 114 may establish a higher threshold if the location data indicates that the vehicle is in a large metropolitan city rather than a smaller suburb.

In this example, the delivery vehicle allocating component 114 may determine multiple regions within the environment to deliver items. As shown in FIG. 1, the delivery vehicle allocating component 114 has identified a first delivery location 124 and a second delivery location 126. In some examples, the number and spacing of delivery locations may be based on delivery data. Delivery data may include predicted locations of sales, number of predicted sales, number of delivery vehicles allocated for delivery, etc. In some examples, the item delivery system 112 may include a delivery vehicle spacing component 116 configured to determine optimal spacing for delivery locations and/or delivery vehicles. In such instances, the delivery vehicle spacing component 116 may interact (e.g., communicate) with the delivery vehicle allocating component. In some examples, the delivery vehicle spacing component 116 may identify with the delivery vehicle allocating component multiple regions of the example environment 100 that have a threshold number of pedestrians. In some examples, the delivery vehicle spacing component 116 may utilize delivery data and/or historical data to determine the spacing of delivery locations within the identified regions.

In some examples, location data may include the type of city (e.g., small town, large metropolitan city, etc.) from which the sensor data was captured, the types of travel used in the region (e.g., public transportation, personal vehicles, one-way roads, freeways, etc.), etc. In some examples, historical data may include a density of pedestrians within the region, a number of pedestrians within the region, a pattern of traffic for the time of day within the region, a pattern of traffic for the time of week within the region, a number of previous sales within the region, an amount of mobile application use within the region, etc. In some examples, forecast data may include current weather within the region, predicted weather within the region, event data (e.g., known events within the region), etc.

Based on identifying a region of the environment that has a threshold number of pedestrians (or likely will), the delivery vehicle allocating component 114 may determine how many vehicles of the fleet of vehicles are available to render a delivery service to the multiple pedestrians 122 within the first delivery location 124 and the second delivery location 126. In some examples, the delivery vehicle allocating component 114 may balance the value of maintaining taxi service vehicles and delivery service vehicles within a region. In some examples, the fleet manager may determine a number of vehicles available for deliver service based on comparing a predicted demand for taxi services within the example environment 100 with a predicted demand for delivery services within the example environment 100. In such instances, the predicted demand may be based on the amount of money the particular service (e.g., taxi service, delivery service, etc.) is estimated to make within a threshold period of time (e.g., one hour, two hours, 6 hours, 24 hours, etc.). Such determinations may be based on historical data for the region, sensor data from the region, and/or forecast data for the region. In this example, the delivery vehicle allocating component 114 may allocate two vehicles of the fleet of vehicles to deliver items to the multiple pedestrians 122. In this example, the delivery vehicle allocating component 114 may maintain the third vehicle 106 as a taxi service vehicle within the example environment 100.

In some examples, the item delivery system 112 may include an item manager 118 configured to determine and manage the delivery of items. In some examples, the item manager 118 may determine an item to deliver to the multiple pedestrians 122 within the first delivery location 124 and the second delivery location 126. In some examples, the item manager 118 may determine the same item for some or all of the delivery locations. Alternatively, the item manager 118 may determine different items for the different delivery locations. In some examples, the items may include ice cream, beverages (e.g., water, soda, etc.), umbrellas, candy, snacks, food, medicine, clothing, tools, first aid equipment, and/or any other items. In some instances, determining an item to deliver may be based on the item manager 118 evaluating historical data, sensor data, forecast data, user responses from mobile applications, vehicle capabilities (e.g., available energy), vehicle status, and/or other datasets. The item manager 118 may select an item to deliver which may be predicted to yield the greatest number of sales and/or profits. For example, the item manager 118 access the user responses from the application manager 120 to determine the type of item requested by the pedestrians. Accordingly, the item manager 118 may weigh some or all of the factors to determine the item to deliver. In this example, the item manager 118 has determined to deliver ice cream to the first delivery location 124 and the second delivery location 126.

Based on having determined an item to deliver, the delivery vehicle allocating component 114 may determine one or more vehicles of the fleet of vehicles to deliver the items to the multiple pedestrians 122 within the different delivery locations. The delivery vehicle allocating component 114 may select any number of available vehicles of the fleet to deliver the items to the region. In some instances, determining which vehicles to commit to delivery, and how many vehicles to commit to delivery, may be based on a number of factors, such as the vehicle's proximity to the region and/or the fulfilment center, the vehicle's current service type (e.g., taxi service vehicle or delivery service vehicle), the vehicle's remaining power compared with the estimated delivery time, and/or other factors. In such examples, if the potential vehicle is a delivery service vehicle, the fleet manager may determine the item currently stocked within the vehicle, the quantity of the stocked item, and/or other considerations. If the potential vehicle is a taxi service vehicle, the fleet manager may determine the vehicle's status (e.g., currently providing ride to user, in-route to pick up user, waiting for ride request, etc.). Based on such factors, the fleet manager may weigh some or all of the above listed factors and may select one or more vehicles to deliver the items to pedestrians within the region. In this example, the delivery vehicle allocating component 114 may select the first vehicle 102 and the second vehicle 104 to deliver items to the multiple pedestrians 122. In some examples, the vehicle allocating component 114 may determine that the second vehicle 104 is already a delivery vehicle with a stock of ice cream. In such instances, the vehicle allocating component 114 may determine that the selecting the second vehicle 104 may reduce delay for the multiple pedestrians 122 and increase opportunity for sales. Further, the vehicle allocating component 114 may select the first vehicle 102 to deliver items. In this example, the first vehicle may be a taxi vehicle, and as such may create added delays.

In some examples, the fleet management system 108 may send instructions to the selected vehicle(s) to transport items to the multiple pedestrians 122 within the delivery locations. In this example, the fleet management system 108 may send instructions to the first vehicle 102 and the second vehicle 104. Instructions may differ based on a number of different factors. For example, if the selected vehicle is currently a taxi service vehicle, the instructions may include instructions to navigate to a fulfillment center to retrieve a quantity of the item, receive a particular type of modular storage unit within which the items may be stored, and/or navigate to the region to deliver the items. In other examples, if the selected vehicle is a delivery service vehicle, the instructions may include instructions to navigate to a fulfillment center to retrieve a quantity of the item (e.g., based on the vehicle having a different item or based on the vehicle having a low inventory of the desired item) and navigate to the region for delivery. In this example, the second vehicle 104 was a delivery vehicle that had the delivery item in stock. As such, the instructions to the second vehicle 104 may include instructing the second vehicle 104 to navigate directly to the first delivery location 124. Further, the first vehicle 102 may currently be associated with a taxi service vehicle. As such, the instructions sent to the first vehicle 102 may include instructing the first vehicle 102 to navigate to a fulfillment center 128 to retrieve the delivery items (including potentially modifying the vehicle body to accommodate such items), and subsequently navigating to the second delivery location 126.

In some instances, the instructions may provide a specific location within the delivery location to which the vehicle may navigate and dispense (e.g., sell) the items. In other examples, the instructions may provide a general location within the region to which the vehicle may navigate. In such examples, upon arriving at the general location, the vehicle may determine a dispensing strategy that includes a specific location to deliver the items. The fleet management system 108 may determine whether to provide a general location or a specific location based on a variety of factors, such as historical data, forecast data, location data, etc.

In some examples, the delivery vehicle allocating component 114 may dynamically update the allocation of delivery vehicles allocated to deliver items to pedestrians within the delivery locations. In some instances, the delivery vehicle allocating component 114 can allocate additional vehicles to deliver items to pedestrians within the delivery locations based on comparing the inventory of delivery vehicles and the remaining predicted demand. In other examples, additional delivery vehicles may be allocated to the region based on pedestrians experiencing wait times that meet or exceed a threshold wait time. In some instances, the delivery vehicle allocating component 114 may receive information from a delivery vehicle that the vehicle has below a threshold quantity of items remaining within the storage unit. The delivery vehicle allocating component 114 may determine a predicted demand for the item within the region based on sensor data from the vehicle and/or user input from the mobile application (e.g., continued item requests). In some instances, the delivery vehicle allocating component 114 may compare the quantity of items remaining with the predicted demand. If the predicted demand meets or exceeds a threshold level of difference (e.g., there is far more remaining purchasers compared to the available inventory), the delivery vehicle allocating component 114 may send instructions to additional vehicles of the fleet of vehicles to transition to a delivery vehicle and transport additional quantity of items to pedestrians within the region. In other examples, the delivery vehicle allocating component 114 may send instructions to the delivery vehicle instructing the delivery vehicle to return to the fulfillment center 128 to restock with additional quantity of the items.

In some examples, the first vehicle 102 and the second vehicle 104 may receive the instructions from the fleet management system 108. In some examples, the vehicles may include an item delivery system 130 which may be configured to receive instructions from the fleet management system 108, in addition to dynamically determining dispensing strategies. The item delivery system 130 of the first vehicle 102 may be integrated within systems of the first vehicle 102. The item delivery system 130 may include various components described below, configured to perform different functionalities of an item delivery service. For instance, the item delivery system 130 may include a dispensing strategy manager 132 which may include a vehicle relocation component 134 configured to determine the methods in which the vehicle may dispense the items to the plurality of pedestrians 122. Further, the item delivery system 130 may include an inventory manager 136 configured to maintain and inventory of the remaining items stored within the delivery vehicle, and a payment component 138 configured to receive payment from pedestrians.

In some examples, the item delivery system 130 may include a dispensing strategy manager 132 configured to determine the methods in which the delivery vehicle may dispense items to pedestrians within the first delivery location 124 and the second delivery location 126. In some instances, the dispensing strategy manager 132 may determine the contents of the instructions sent by the fleet management system 108. In this situation, the dispensing strategy manager 132 may determine that the first vehicle 102 is instructed to follow a path 140 to the fulfillment center 128. In such instances, the fulfillment center 128 may have a loading and/or offloading location 142 from which the first vehicle 102 may obtain the delivery items and any additional storage units needed to store the delivery items. Further, the dispensing strategy manager 132 may determine that the instructions instruct the first vehicle 102 to navigate along the path 144 to the second delivery location 126. In this example, the second delivery location 126 is marked with an ice cream cone within a circle. Additionally, the dispensing strategy manager 132 may determine that the second vehicle 104 is instructed to follow path 146 to a first delivery location 124.

Upon the first vehicle 102 arriving to the first delivery location 124 and the second vehicle 104 arriving to the second delivery location 126, the vehicles may receive sensor data of the delivery locations. Such sensor devices may include radar devices, lidar devices, image capturing devices, time-of-flight devices, etc. In such instances, the sensor data may be captured within a threshold period of time (e.g., 1 second, 5 seconds, 1 minute, 10 minutes, etc.). In some examples, the dispensing strategy manager 132 may detect and locate groups and/or groupings of pedestrians within the delivery locations based on the sensor data.

Based on determining the location(s) of groups of pedestrians within the delivery locations, the dispensing strategy manager 132 may determine a dispensing strategy. In some examples, the dispensing strategy may describe how the vehicles will deliver the goods to the plurality of pedestrians within the delivery location. In such instances, the dispensing strategy may be based on a number of factors including historical data for the region, forecast data, and/or region characteristic data. Such region characteristic data may include location information (e.g., city type, type of travel within the region (e.g., public transportation, one-way streets, etc.)), pedestrian density, pedestrian movement (e.g., where and how pedestrians are moving), zoning regulations, local laws, pedestrian safety, etc. The dispensing strategy manager 132 may analyze such data to determine the dispensing strategy. In determining the dispensing strategy, the vehicle may consider whether to deliver the items from a fixed location (e.g., parking lot, curbside parking, etc.) or while driving around the delivery location. Further, the dispensing strategy manager 132 may also consider targeting specific pedestrians within the delivery location. For example, the dispensing strategy manager 132 may identify pedestrians with the item, and pedestrians without the item. In at least some such examples, sensor data may be relayed to a remote computing system such that the remote computing system (or a user associated therewith) may provide suggestions for optimal dispensing locations or strategies. In some examples, the vehicles may execute the dispensing strategy.

In some examples, the dispensing strategy manager 132 may update the dispensing strategy. The dispensing strategy manager 132 may include a vehicle relocation component 134 configured to update the dispensing strategy. In some examples, updating the dispensing strategy may include causing the vehicle to relocate to a different location within the delivery location, navigating to the fulfillment center 128 to restock with additional quantity of the item, transition from a delivery service vehicle to a taxi service vehicle, etc. The vehicle relocation component 134 may determine an updated dispensing strategy based on a variety of factors such as, changes in the groups of pedestrians (e.g., pedestrians are moving around the region), changes in parking (e.g., better parking has become available), remaining inventory has gone below a threshold level, sales have gone below a threshold level, etc. For example, the inventory manager 136 may determine that the vehicle has below a threshold level of items remaining in stock. In such instances, the inventory manager 136 may communicate with the fleet management system 108 to determine an updated dispensing strategy. In some examples, the vehicle may execute the updated dispensing strategy. Additional information regarding dynamically updating dispensing strategies is described below in FIGS. 4, 5, and 7.

In some examples, the item delivery system 130 may receive payment from pedestrians within the delivery location in exchange for the item. The item delivery system 130 may include a payment component 138 configured to receive payment from pedestrians. For example, a pedestrian may purchase one or more items from the vehicle's stock of items based on providing payment for the item(s). Pedestrians may provide payment via a mobile application or via an interactive surface of the vehicle. For example, a pedestrian may purchase the item via a mobile application associated with the vehicle. Alternatively or additionally, a pedestrian may order and/or pay for items via an interactive surface of the vehicle. Additional information regarding receiving payment is described below in FIGS. 2A, 8, and 9.

Figure 2A:
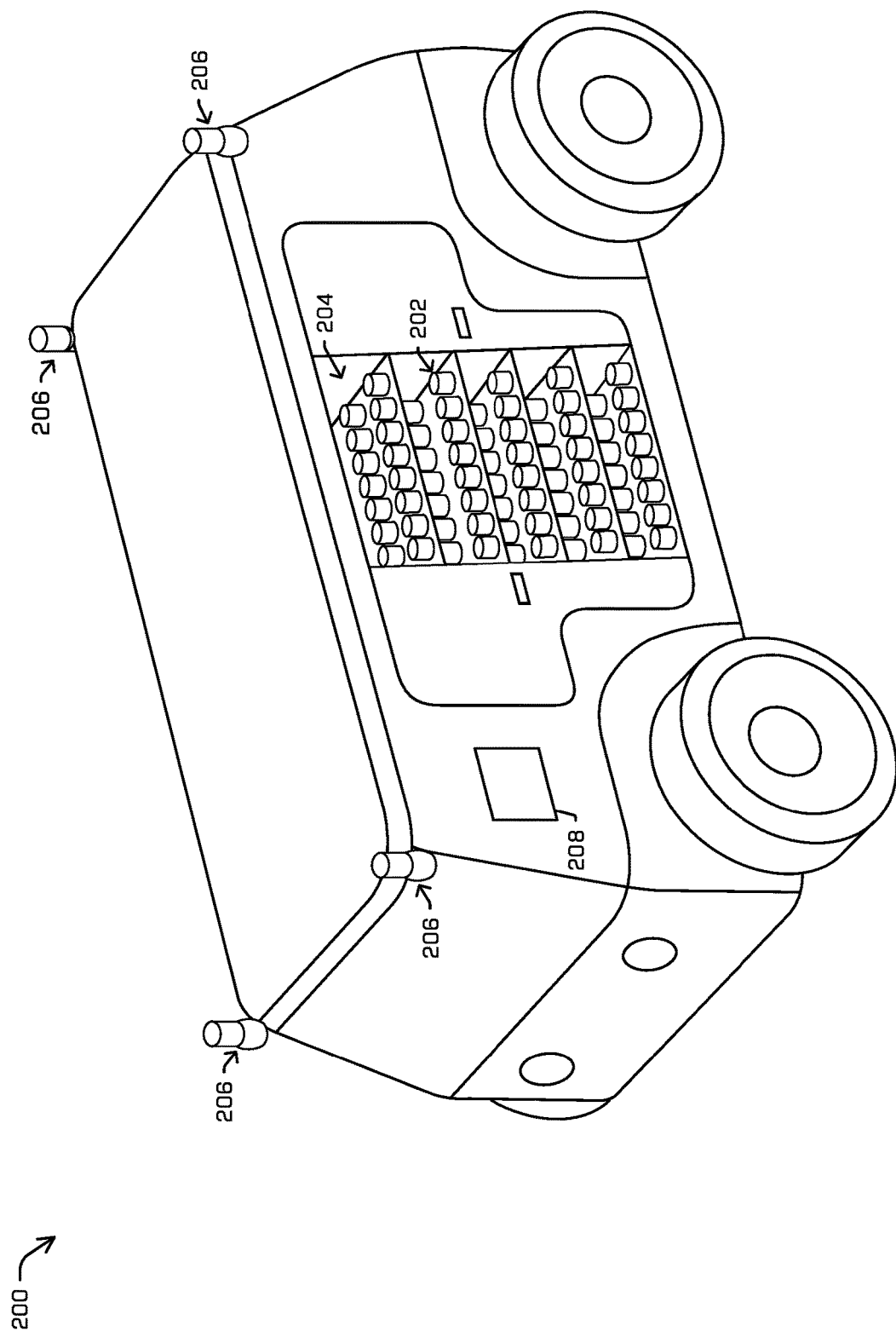
FIG. 2A depicts an example delivery vehicle configured to store a quantity of items, in accordance with one or more examples of the disclosure.

FIG. 2A depicts an example delivery vehicle 200 configured to store a quantity of items 202.

In some examples, the example delivery vehicle 200 may be similar or identical to the delivery vehicles described in FIG. 1. As described above, the delivery vehicle 200 may include a quantity of items 202 to be delivered, as well as a storage unit 204 within which the items 202 are stored. In this example, the items 202 may be containers of ice cream; however, in other examples the items 202 can be water bottles, candy, snacks, umbrellas, clothing, medicine, tools, and/or other items. In this example, the storage unit 204 may be a refrigerator or freezer; however, in other examples, the storage unit 204 may be an ice cream machine, a cargo unit, lockers, etc. In some examples, the storage unit 204 may be a modular cassette that is used in lieu of the seating compartment, or the storage unit 204 may be equipment that is used in and/or around the vehicle's existing seating. However, the configuration of the items 202 within the storage unit 204 is merely illustrative and, in other examples, the number, type, shape, size, and/or locations of the items 202 within the storage unit 204 may vary based on a variety of factors, such as a size and/or type of vehicle (e.g., car, truck, van, bus, aerial vehicle, aquatic vehicle, etc.), a number and/or size of the items 202 to be delivered, a nature of items 202 to be delivered (e.g., ice cream, water, umbrellas, clothing, prepared/hot foods, refrigerated foods, medicine, etc.), whether the vehicle will also be transporting passengers, etc.

Examples of techniques for vehicle configuration in addition to delivery route determinations can be found, for example, in U.S. application Ser. No. 17/131,308, filed Dec. 22, 2020, and titled "Mobile Delivery System With Secure Access Lockers," and in U.S. application Ser. No. 17/358,351, filed Jun. 25, 2021, and titled "Passenger and Item Coordinated Delivery System," the contents of which is herein incorporated by reference in its entirety and for all purposes.

In some examples, the example delivery vehicle 200 may include sensors 206, installed within view of but outside of the storage unit 204 on the delivery vehicle 200, which may be activated to detect and capture images/video of the items 202 being removed from the storage unit 204. Sensors 206 may include, for example, cameras, motion sensors, lidar sensors, radar sensors, sonar sensors, combinations or assemblies of any or all of these or other sensor modalities, and may be installed with field(s) of vision that cover both the storage unit 204 and the area in the proximity of the delivery vehicle 200 to detect approaching users. For instance, sensors 206 may include cameras used to capture images of users interacting with the items 202, and to identify or authenticate the users as valid purchasers. Although four (4) sensors 206 are shown in this example, any number of one or more sensors 206 may be used in other examples. Also, each sensor 206 may represent multiple individual sensors of the same or different modalities of sensor. For instance, each sensor 206 shown in FIG. 2A may represent an assembly comprised of multiple cameras and multiple lidar sensors oriented at different angels to provide coverage of an area surrounding a body of the vehicle. After delivering items to pedestrians with a region, the delivery vehicle 200 may return (e.g., autonomously or at the direction of an item delivery system) to a warehouse, supply facility, or other fulfillment location to be reloaded (e.g., restocked) and dispatched for additional item deliveries.

In some examples, the example delivery vehicle 200 may include an interactive surface 208 from which pedestrians may order and/or provide payment for the items 202. In this example, the interactive surface 208 may be associated with a side portion of the delivery vehicle 200. However, in other examples the interactive surface 208 may be disposed on, or built into, any other surface of the delivery vehicle 200. Further, FIG. 2A depicts the interactive surface 208 as a square surface; however, in other examples the interactive surface 208 may be any other shape and/or size. In some examples, the interactive surface 208 may include a screen from which pedestrians may order items 202. For example, a pedestrian may utilize the interactive surface 208 to select the types and/or varieties of items 202 the pedestrian would like to purchase. Upon selecting items 202 for purchase, the pedestrian may select a desired method of payment. Such methods may include payment via a mobile application associated with the vehicle, while other methods may include touching (e.g., or hovering) a credit/debit card over the interactive surface 208.

In other examples, the interactive surface 208 may not include a screen, but may be a payment surface. For example, pedestrians may order the items 202 for purchase via a mobile application, and may either provide payment via the mobile application or touch a credit/debit card over the interactive surface 208. In other such examples, pedestrians may take one or more items 202 from the storage unit 204 and the delivery vehicle 200 may determine which items 202 were taken and the quantity of the items 202 taken and charge the pedestrian via the pedestrian touching a debit/credit card to the interactive surface 208. For example, a pedestrian may approach the delivery vehicle 200 and take multiple items 202 (e.g., containers of ice cream) from the storage unit 204. In such instances, the delivery vehicle 200 may utilize sensor data associated with the storage unit to determine the types and quantity of items 202 taken, and provide a total price at the interactive surface 208.

In various examples, the interactive surface 208, as well as other emitters may be used to broadcast a message to proximate pedestrians of the offering (e.g., visually, audibly, etc.). In at least some examples, the vehicle 200 and/or the fleet manager may send (e.g., over a network communication using an API), a signal to mobile devices associated with one or more pedestrians to inform them that the vehicle 200 is at a particular location to dispense the item(s). In some such examples, broadcast may be limited to those pedestrians who are currently showing interest and/or have previously shown interest or purchased the item(s). As a non-limiting example of such, beam-formed audio may be used to target only those relevant pedestrians and/or messages may only be sent out to a subset of users in proximity to the vehicle that have indicated an interest and/or shown interest in the past.

Figure 2B:
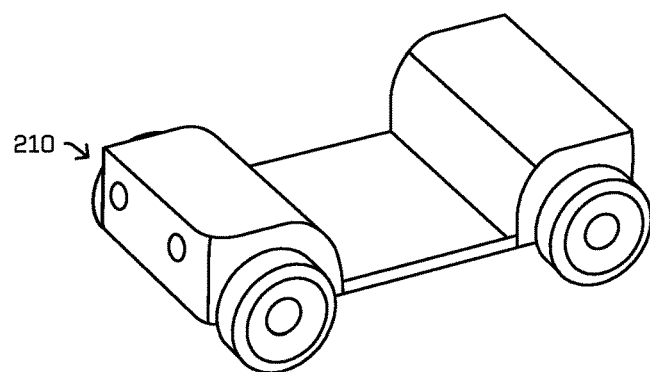
FIG. 2B illustrates an example vehicle drive assembly configured to receive a body module cassette, in accordance with one or more examples of the disclosure.
Figure 2B:
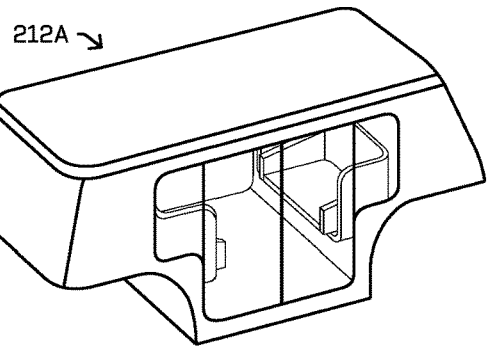
Figure 2B:
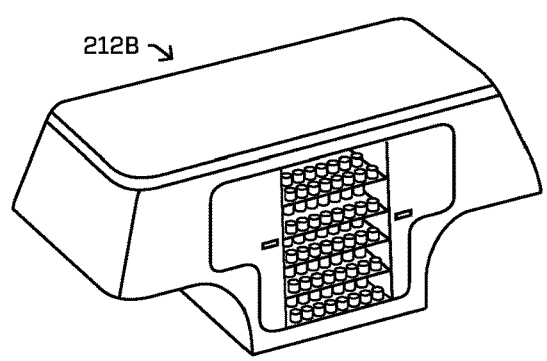
Figure 2C:
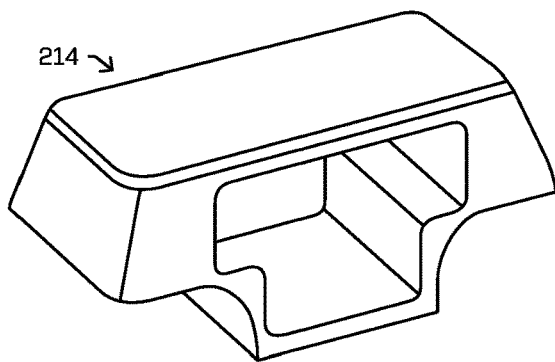
FIG. 2C illustrates an example vehicle drive assembly configured to receive a body module cassette, in accordance with one or more examples of the disclosure.
Figure 2C:
Figure 2C:
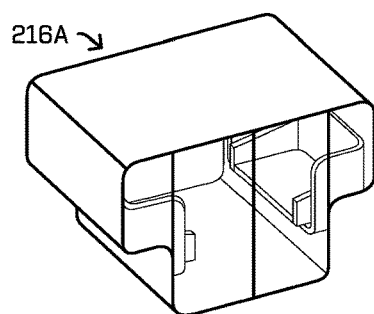
Figure 2C:
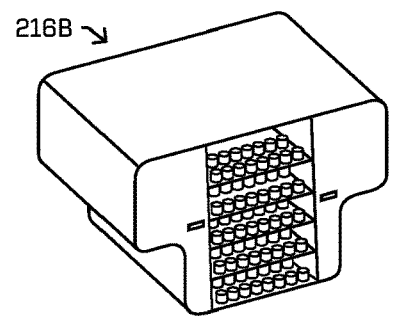
Figure 2D:
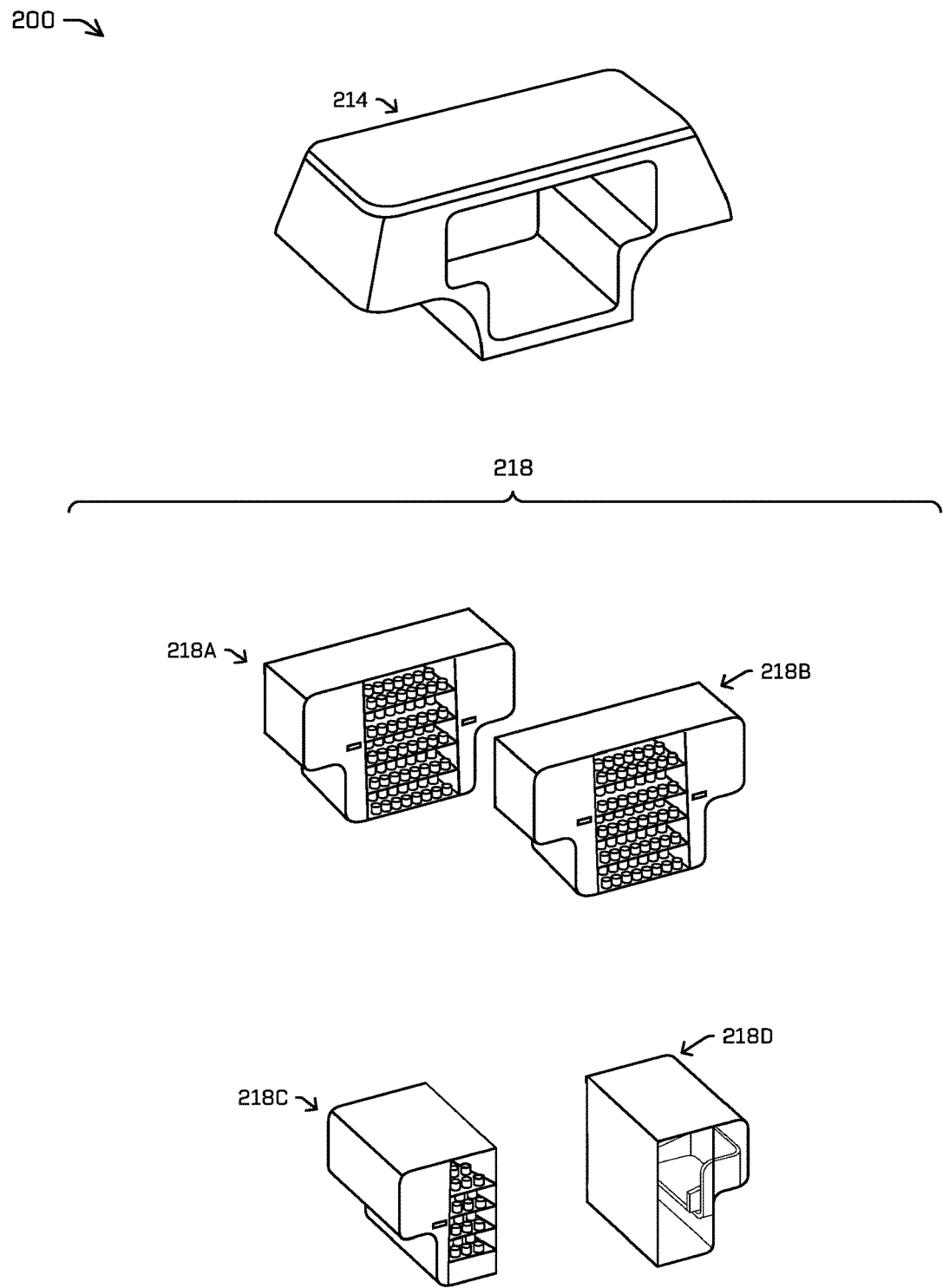
FIG. 2D illustrates an example vehicle drive assembly configured to receive a body module cassette, in accordance with one or more examples of the disclosure.

FIGS. 2B, 2C, and 2D, illustrate examples of a modular delivery vehicle 200. In some examples, any delivery vehicle 200 may be implemented using a modular vehicle construction as shown in the delivery vehicle(s) shown in FIGS. 2A-2D. Modular delivery vehicles 200 may comprise relatively few assemblies, or "modules," that are mated during a final assembly step or process. In some examples, a vehicle 200 may be assembled from two main types of modules, for example, a body (or refrigerator) module and a drive module (e.g., at least one drive module at one end of the refrigerator module). Some examples of a modular vehicle architecture including a body module and multiple drive modules which may, in some examples, be used in connection with the instant delivery vehicle can be found in U.S. patent application Ser. No. 15/674,688, filed Aug. 11, 2017, which is incorporated herein by reference.

In some examples, a single type of drive module may be used with different types of storage modules (e.g., refrigerator, freezer, ice cream machine, etc.), further reducing complexity. For instance, different models of storage modules may be constructed containing different numbers, types, configurations, and features of storage units 204, where each different storage module nonetheless may be compatible with the same drive module(s), thus allowing for more efficient item loading, and for storage module interchangeability depending on the types of items to be delivered. Modular designs may provide advantages for design and construction of delivery vehicle, including allowing the vehicle assembly plant to be more simple, compact, and inexpensive to construct and maintain. In addition, inventory management may be simplified as the assembly plant need only maintain the few modules used to assemble the vehicle in inventory.

The modular construction described herein also may improve the efficiency of item delivery and the serviceability of the delivery vehicles 200. For instance, storage modules (or cassettes) may be preloaded with items for delivery at a warehouse or fulfillment center, and then attached to the drive module after the loading process is completed, thus decreasing the amount of idle time of the drive modules which may improve delivery efficiency. Additionally, in the event of a failure or fault with a component of a single drive module or storage module, the faulty module can be simply and quickly removed and replaced with another module. For instance, if a fault occurs with a motor, battery, or other major system of a drive module, the drive module may be removed from the vehicle and replaced with another drive module. The replacement of a module may be performed by service personnel, an automated service robot (or robotic cart, as discussed below), or a combination thereof.

As shown in FIGS. 2B, 2C, and 2D, in some examples a vehicle drive assembly 210 may be assembled separately and configured to receive a body module cassette 212 that can be inserted and removed from the vehicle drive assembly 210 without disassembling the vehicle drive assembly 210.

FIG. 2B illustrates an example vehicle drive assembly configured to receive a body module cassette. For example, the vehicle drive assembly 210 may include one or more drive assemblies, wheels, and various other operational components and sensors of the vehicle 200. Multiple different body module cassettes 212 may include internal frame structures and may be compatible with the vehicle drive assembly 210, so that any of the cassettes 212 may be inserted onto and removed from the vehicle drive assembly 210 during the loading process. In FIG. 2B, two example body module cassettes 212 are shown: a passenger cassette 212A and a refrigerator module cassette 212B. Each cassette 212 may include a vehicle frame and may be configured for insertion into the same drive assembly 210, thus allowing refrigerator module cassettes 212B to be interchangeably loaded and unloaded when it is not attached to the drive assembly 210.

FIG. 2C illustrates an example vehicle drive assembly configured to receive a body module cassette. In this example, additional example is shown of a modular vehicle assembly in which a generic vehicle frame 214, which may be configured to attach to a vehicle drive assembly 210 and may be configured to receive one or more of the interchangeable body module cassettes 216. In some instances, the generic vehicle frame 214 may be a standardized component including any of the vehicle computer systems and/or sensor systems described herein. The generic vehicle frame 214 may be configured to receive purpose-built cassettes 216. As in the above example, body module cassettes 216 may be interchangeable and designed for specific purposes, such as passenger cassette 216A and a refrigerator module cassette 216B. However, in this example the body module cassettes 216 need not include the vehicle frame components, and may be inserted into the generic vehicle frame 214 rather than directly into the drive assembly. In some examples, the generic vehicle frame 214 may receive additional types of body module cassettes, such as a hybrid refrigerator/passenger cassette (e.g., shown in FIG. 3), a vehicle recharging body module cassette (e.g., including with a larger battery and/or additional batteries or generators) that may be used to provide additional battery life to the vehicle 200 and/or to charge other vehicles.

FIG. 2D illustrates an example vehicle drive assembly configured to receive a body module cassette. In this instance, additional examples are shown of modular vehicle assemblies in which a generic vehicle frame 214, which may be configured to attach to a vehicle drive assembly 210 may be configured to receive multiple interchangeable body module cassettes 218. In this example, the generic vehicle frame 214 may be configured to receive two different purpose-built cassettes 218, and different combinations of purpose-built cassettes 218 may be used depending on, among other things, the items to be delivered by the delivery vehicle 200, and the size and weight load capacity of the delivery vehicle 200, predicted demand for the delivery service, etc. For instance, an item delivery system may select one or more purpose-built cassettes based on the item specifications of the items to be delivered. The item specifications for an item to be delivered may include data such as the size/dimensions, weight, item type, fragility, temperature requirements, cost/value, security requirements, user authentication requirements, and the like. Depending on the item specifications for one or more items to be delivered, and cassette availability, the item delivery system may select one or more purpose-built cassettes capability of storing the items and satisfying any item-specific transportation (e.g., temperature requirements, lighting requirements, cushioning/padding requirements, noise requirements, etc.) and/or any or delivery requirements (e.g., advanced user authentication requirements).

Purpose-built cassettes 218A and 218B may be inserted and secured onto different lateral sides (e.g., left and right)

of the delivery vehicle 200, so that each purpose-built cassette may be non-destructively detached, loaded, and reattached independently of the other. In this example, the purpose-built cassettes 218A and 218B may be oriented so that for cassette 218B the front (or recipient-facing) side of the refrigerator are shown, while the back side of the refrigerator (through which the items may be loaded at a warehouse or fulfillment center) are shown for cassette 218A. In the other examples shown, the purpose-built cassettes 218C and 218D may be configured to be inserted and secured onto either longitudinal end (e.g., front or back) of the delivery vehicle 200. The purpose-built cassettes 218C and 218D may be interchangeable and each designed for specific purposes, such as a first refrigerator module cassette 218C and a passenger cassette 218D. Additionally, although the examples shown in FIG. 2D depict purpose-built cassettes 218 as either lateral or longitudinal halves of the generic vehicle frame 214, it is contemplated that any other size or number of purpose-built cassettes may be used in other examples (e.g., quarter-sized cassettes which are quarter length, quarter width, or half-length and half-width, etc., or any configuration of smaller-sized purpose-built cassettes cassettes).

Figure 3:
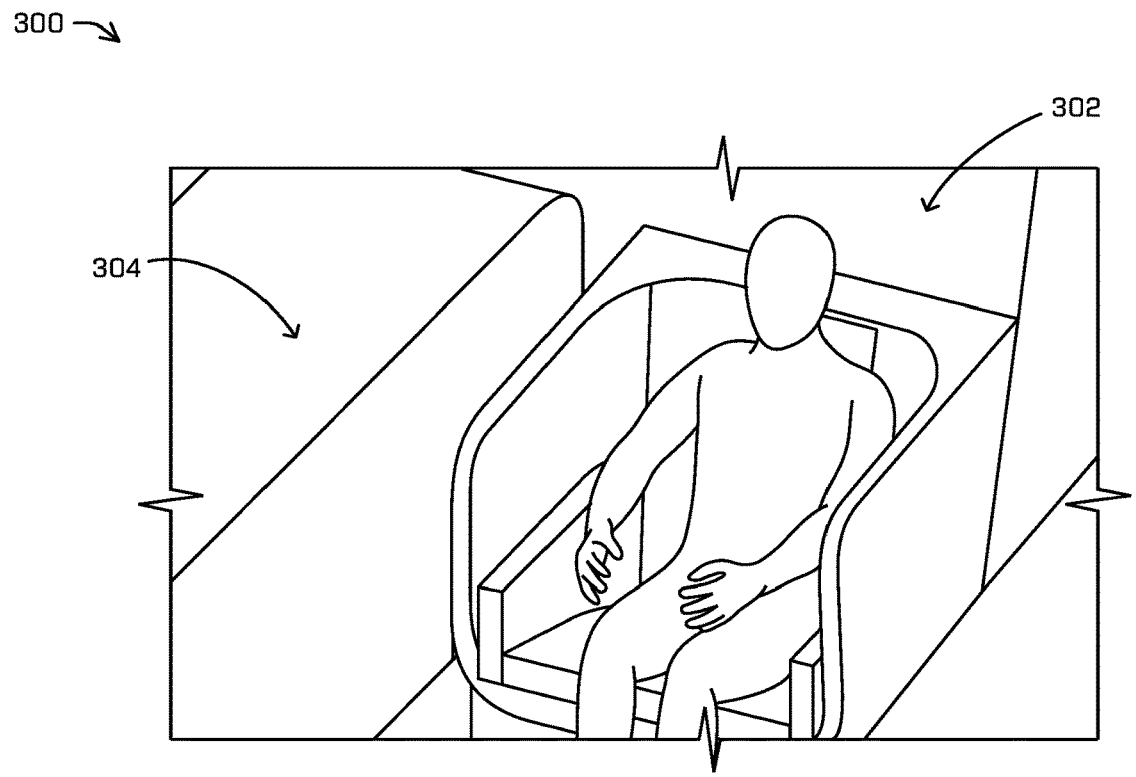
FIG. 3 is a perspective view of an example delivery vehicle, in accordance with one or more examples of the disclosure.
Figure 3:
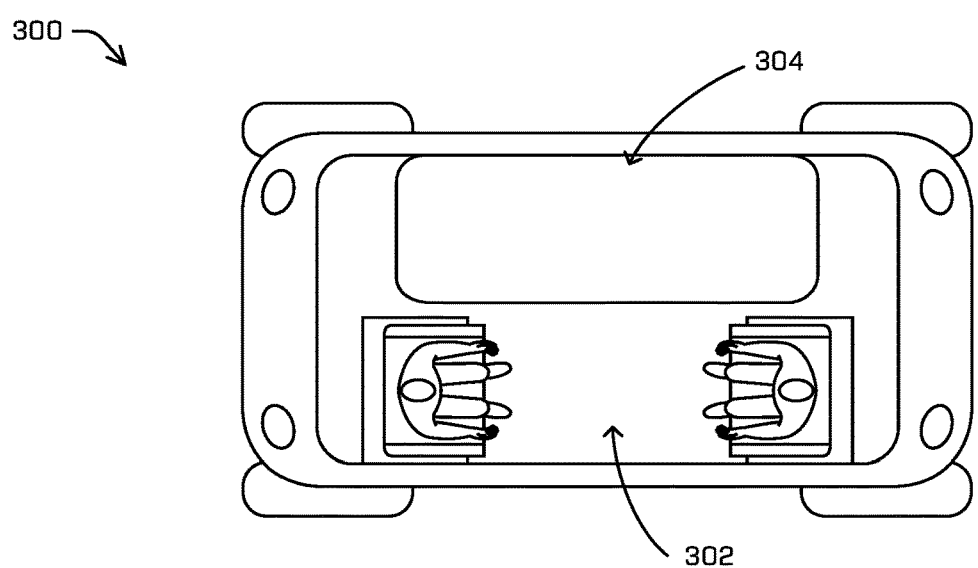

FIG. 3 is a perspective view of an example delivery vehicle 300. In this example, delivery vehicle 300 includes both a passenger compartment and a storage unit (e.g., refrigerator), to allow for scenarios of transporting passengers at the same time as delivering items to passengers. Delivery vehicles 300 containing both passenger compartments and lockers may be constructed using a number of different techniques. In some cases, delivery vehicle 300 may be a modular delivery vehicle as described above, in which a single body module cassette includes one or more passenger cassette (or compartments) and one or more integrated storage cassettes. As discussed above, the body module cassette may be attached to and detached from one or more drive modules during the vehicle assembly process.

Delivery vehicles 300 may support different types of vehicle body constructions (e.g., body module cassettes) that include both passenger compartments and storage units (e.g., refrigerators, freezers, ice cream machines, etc.). In some examples, a first lateral side of the delivery vehicle 300 may include a refrigerator module cassette 304, while a second lateral side includes a door providing access to a passenger compartment 302, or vice versa. Additionally or alternatively, a first longitudinal end of the delivery vehicle 300 may contain a refrigerator while a second longitudinal end of vehicle may include a passenger compartment, or vice versa. In some examples, the delivery vehicle 300 can be bidirectional, such that each longitudinal end can alternately be the leading or trailing end of the vehicle, and each lateral side can alternately be the right or left side of the delivery vehicle, depending on the direction of travel. Different types of body module cassettes for delivery vehicle 300 may include different allocations of space for passengers and storage unit. For example, a first design may include a relatively small passenger compartment 302 with a single seat and a large refrigerator module cassette 304, while a second design may include a larger passenger compartment 302 with seating for multiple passengers but a relatively small refrigerator module cassette 304 for goods. For instance, a delivery vehicle 300 may include a body module cassette having any number of different passenger compartment to refrigerator storage ratios (e.g., 50/50, 60/40, 70/30, 80/20, 90/10, or vice versa), depending on the delivery requirements of the vehicle.

In some examples, for delivery vehicles 300 that include both passenger compartments 302 and storage module cassettes 304, the passenger compartment may be customized based on the types of items being delivered. For example, specialized delivery vehicles 300 may deliver clothing to pedestrians, and the passenger compartment 302 may be designed as a dressing room to allow the recipients to inspect and try on the clothes before deciding whether or not to keep the items. In other examples, specialized delivery vehicles 300 may deliver food to recipients, and the passenger compartment 302 may be designed as a dining area to allow the recipient to eat the food in a comfortable and private environment. In still other examples, specialized delivery vehicles 300 may deliver electronic equipment to users (e.g., computing devices, cameras, televisions, video game systems, digital content, etc.), and the passenger compartment may be outfitted with the computing devices and accessories (e.g., power outlets, adaptors, screens, etc.) to allow the recipient to test out the electronic equipment before deciding whether to keep or reject the items.

Figure 4:
FIG. 4 illustrates an example environment with a fleet manager managing a fleet of vehicles, in accordance with one or more examples of the disclosure.

FIG. 4 illustrates an example environment 400 with a fleet management system managing a fleet of vehicles. Specifically, FIG. 4 describes a fleet management system relocating vehicles from a first region to a second region based on the second region having a larger number of pedestrians and/or larger predicted demand.

In this example, the example environment 400 may include a first region 402 and a second region 404. In some examples, the first region 402 and the second region 404 may be adjacent regions within the example environment 400. In other examples, the first region 402 and the second region 404 may be separated by numerous other regions. In this example, the first region 402 may include a number of vehicles of a fleet of vehicles, and the second region 404 may include a number of vehicles of the same fleet of vehicles.

The fleet of vehicles may be managed by a fleet management system, as described in FIG. 1. In some examples, the fleet management system may receive data (e.g., sensor data, inventory data, etc.) from some or all of the vehicles of the fleet of vehicles from both regions via a network.

In this example, the fleet management system may receive sensor data from the vehicles within the first region 402. The fleet management system may determine that at least a portion of the vehicles within the first region 402 may be waiting for taxi service requests. Further, the fleet management system may determine that there is a low number of pedestrians within the first region 402. In such instances, the fleet management system may analyze the sensor data from some or all of the vehicles within the first region 402 to determine the pedestrian density and/or population of the region. The fleet management system may also receive sensor data from the vehicles within the second region 404. In such instances, the fleet management system may use the sensor data of the second region 404 to determine that the there is a large number of pedestrians and few vehicles. For example, the fleet management system may receive sensor data from a vehicle 406 that is delivering items to pedestrians within the second region 404. Based on the sensor data from the vehicle 406, the fleet management system may determine that there is a large number of pedestrians and/or predicted demand for the item.

In some examples, the fleet management system may determine whether to relocate and/or reallocate vehicles of the first region 402 to perform services in the second region 404. The fleet management system may determine the predicted demand for the taxi service vehicles and delivery service vehicles in the first region 402 and the second region 404. As described above, determining the predicted demand may be based on the amount of money the particular service is estimated to make within a threshold period of time. Further, the fleet management system may also determine the predicted demand for the vehicles of the first region 402 if such vehicles were relocated to the second region 404. In this example, the fleet management system may determine an updated allocation of vehicles based on determining that a portion of the vehicles from the first region 402 would yield larger profits if they were in the second region 404. As such, the fleet management system may determine to relocate a portion of the vehicles in the first region 402 to the second region 404.

In some examples, the fleet management system may send instructions to a vehicle 408 and a vehicle 410. In such instances, the instructions may cause vehicle 408 to navigate along the path 412 to relocate to the second region 404. Further, the instructions may cause vehicle 410 to navigate along path 414 to the second region 404. In some examples, the fleet management system may cause some of the relocating vehicles to transition to a delivery vehicle, while maintaining some of the relocating vehicles as taxi service vehicles.

Figure 5:
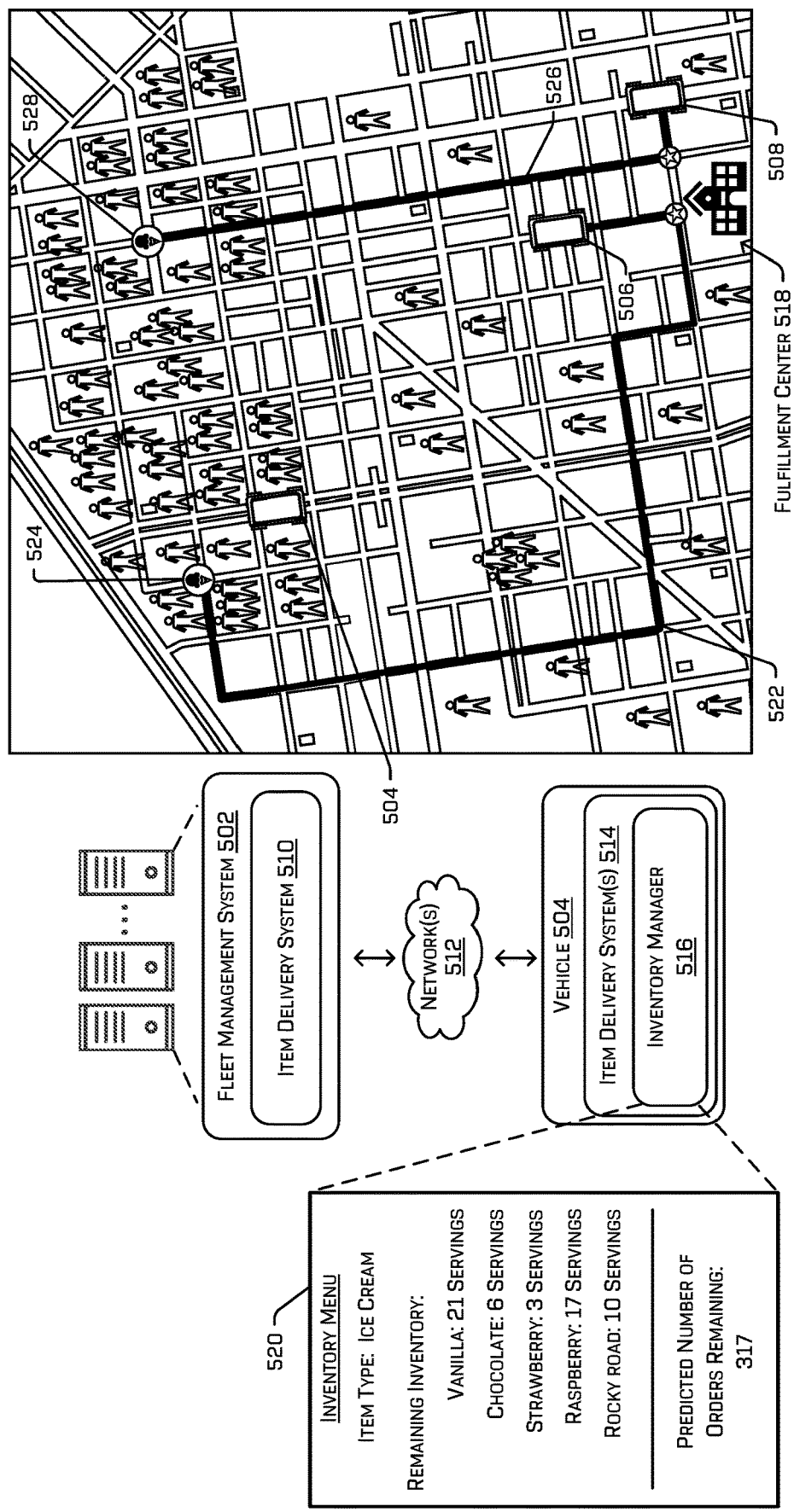
FIG. 5 illustrates an example environment within a fleet management system managing a fleet of vehicles, in accordance with one or more examples of the disclosure.

FIG. 5 illustrates an example environment 500 within a fleet management system 502 managing a fleet of vehicles. Specifically, FIG. 5 describes a fleet management system 502 allocating vehicles to deliver items based on current delivery vehicles having low inventory.

In this example, the example environment 500 may include vehicles providing delivery services and taxi services. Specifically, the example environment 500 may include a first vehicle 504 rendering a delivery service to pedestrians within a delivery location, a second vehicle 506 rendering a taxi service, and a third vehicle 508 rendering a taxi service. Of course, in other examples the example environment 500 may include more or less vehicles performing different services.

In this example, the vehicles may be managed by a fleet management system 502 which may include various components, such as an item delivery system 510. In some examples, the vehicles communicate with the fleet management system 502 via the network 512. In some examples, the fleet management system 502 and the components associated therewith may be the same or similar to those components described in FIGS. 1 and 4. Further, the first vehicle 504 may include an item delivery system 514 which may include an inventory manager 516. In some examples, the item delivery system 514 and the associated components may be the same or similar to those components described in FIGS. 1 and 4.

In this example, the first vehicle 504 may include an inventory manager 516 configured to maintain an inventory for the delivery items remaining on the first vehicle 504. In some examples, the inventory manager 516 may receive a total item count upon being stocked by the fulfillment center 518. Upon pedestrians purchasing the items from the first vehicle 504, the inventory manager 516 may update the total item count. As shown in FIG. 5, box 520 may be a representation of the remaining items in stock within the first vehicle 504. In such examples, the box 520, or the inventory menu, may indicate the item stocked within the first vehicle 504; which in this case is ice cream. Further, the box 520 may include a list of the remaining inventory for the various types of items. In this example, the remaining inventory may include a type of ice cream followed by how many servings remain within the delivery vehicle. Additionally, the box 520 may include a predicted number of orders remaining.

In some examples, the inventory manager 516 may send notifications to the fleet management system 502 when the remaining inventory is below a threshold level. For example, the inventory manager 516 may determine that there is a certain number or servings remaining in stock. Further, the inventory manager 516 may determine the number of predicted orders remaining. Determining the number of predicted orders remaining may be based on determining how many pedestrians remain proximate to the first vehicle 504, how many pedestrians around the first vehicle 504 do not have the item, continued user responses via mobile applications, and/or other factors. In such instances, the inventory manager 516 may compare the remaining inventory to the predicted number of orders remaining to determine whether the predicted number of orders remaining meets or exceeds a threshold level of orders. In such instances, the inventory manager 516 may send a notification to the fleet management system 502.

In some examples, the fleet management system 502 may receive a notification that the first vehicle 504 may have below a threshold level of items remaining. In such instances, the fleet management system 502 may allocate additional vehicles to deliver items to pedestrians within the delivery location. As such, the fleet management system 502 may send instructions to the second vehicle 506 to navigate to the fulfillment center 518 to retrieve the delivery items, and subsequently follow path 522 to the first delivery location 524. Further, the fleet management system 502 may send instructions to the third vehicle 508 to navigate to the fulfillment center 518 to retrieve the delivery items, and subsequently follow path 526 to the second delivery location 528. In some examples, the fleet management system 502 may send instructions to the first vehicle 504 to return to the fulfillment center 518 to retrieve additional quantity of the delivery items, or may instruct the first vehicle 504 to transition to a taxi service vehicle upon the remaining items being sold.

Figure 6:
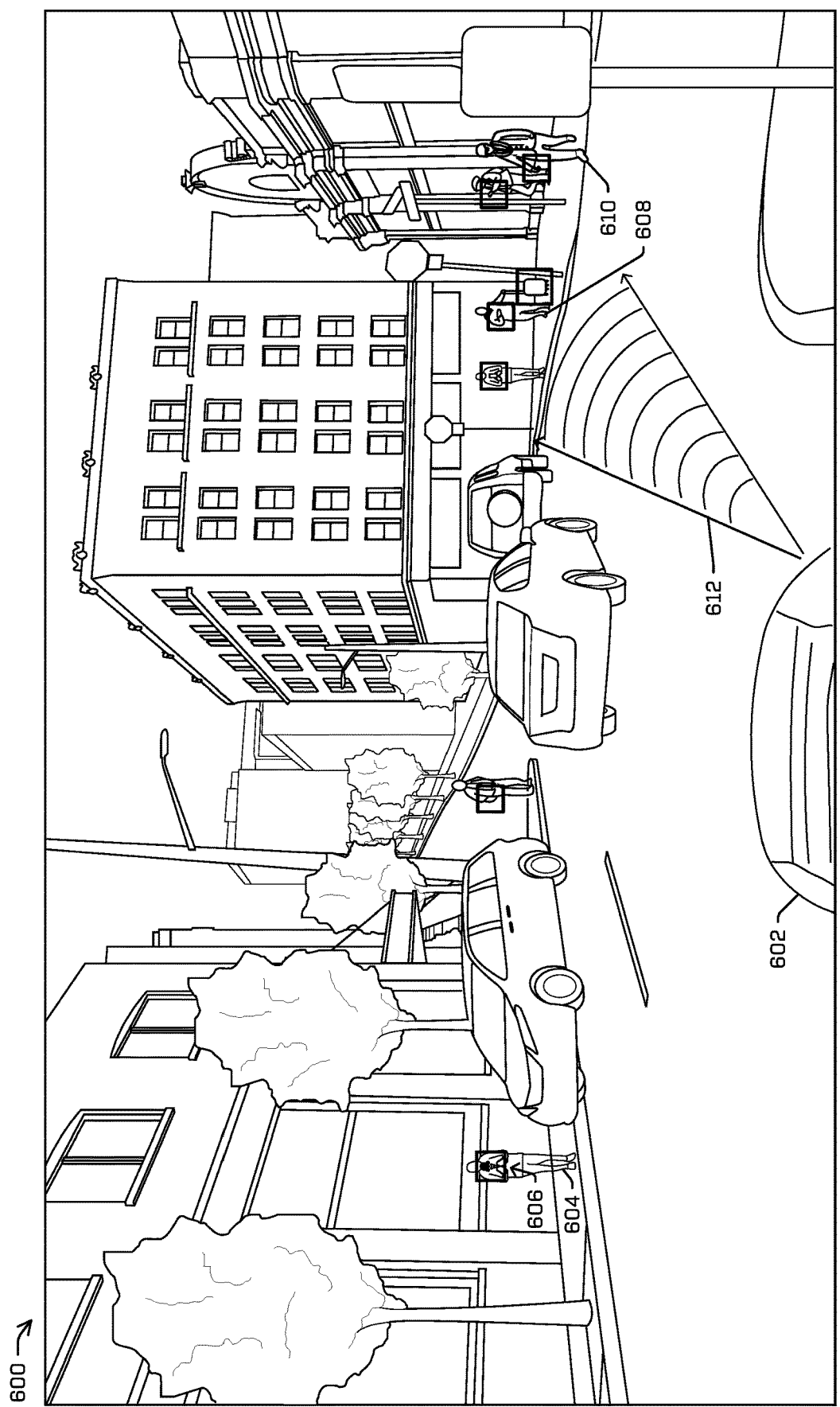
FIG. 6 illustrates an example environment in which a vehicle may target specific pedestrians, in accordance with one or more examples of the disclosure.

FIG. 6 illustrates an example environment 600 in which a vehicle may target specific pedestrians.

In this example, the example environment 600 may include a vehicle 602. The vehicle 602 may be a delivery vehicle delivering items to pedestrians within the example environment 600. In this example, the vehicle 602 may be delivering ice cream; however, in other examples the vehicle 602 may deliver other items, as described above. The example environment 600 may include multiple pedestrians at various locations. In some examples, the vehicle 602 may receive sensor data of the example environment 600 and use such sensor data to detect the multiple pedestrians. In some examples, the vehicle 602 may utilize the sensor data to determine whether such pedestrians are holding the item (e.g., ice cream). For example, the vehicle 602 may generate bounding boxes around objects in the pedestrian's hands. Alternatively, the vehicle 602 may utilize the sensor data to determine whether the pedestrians have and/or are associated with the delivery item (e.g., shirts, shorts, sports apparel, hats, etc.). For example, if the delivery item is clothing, the vehicle may generate bounding boxes around the relevant parts of the pedestrian (e.g., head, torso, legs, etc.). In such instances, the vehicle 602 may determine if the object within the bounding box is the item. In other examples, a detector may be trained to determine if the item is detected and the bounding box may provide a likelihood of the item being present in the environment proximate the vehicle.

In some examples, the vehicle 602 may determine a dispensing strategy to target specific pedestrians based on identifying pedestrians without the item (e.g., a difference in detection of a pedestrian and a pedestrian holding the item). For example, the vehicle 602 may determine that the pedestrian 604 is holding an object. Further, the vehicle 602 may determine that the object within the bounding box 606 is ice cream. As such, the vehicle 602 may determine that the pedestrian 604 has the item the vehicle 602 is delivering. The vehicle may identify a subset of pedestrians within the example environment 600 that do not have the item. For example, the vehicle 602 may determine that pedestrian 608 is holding a phone and suitcase, while pedestrian 610 is not holding anything. In such instances, the vehicle 602 may determine that the dispensing strategy may include targeting pedestrian 608 and pedestrian 610. The vehicle 602 may target such pedestrians by emitting directed light towards to the pedestrians, as well as outputting directed audio towards the pedestrians. In this example, the vehicle 602 may output directed audio 612 directed towards pedestrian 608 and pedestrian 610. Example techniques for emitting directed sounds and/or light towards objects can be found, for example, in U.S. Pat. No. 11,104,269, filed Oct. 17, 2019, and titled "Dynamic Vehicle Warning Signal Emission" the contents of which is herein incorporated by reference in its entirety and for all purposes. Further, such techniques can be found in U.S. Pat. No. 9,878,664, filed Nov. 4, 2015, and titled "Method For Robotic Vehicle Communication With an External Environment Via Acoustic Beam Forming," the contents of which is herein incorporated by reference in its entirety and for all purposes. In some examples, the vehicle 602 may navigate to a location proximate the subset of pedestrians without the item. Other methods of targeting pedestrians that do not have the item may include parking at a location which may enable pedestrians from both sides of the road to be serviced (e.g., park next to a cross walk, etc.).

Figure 7:
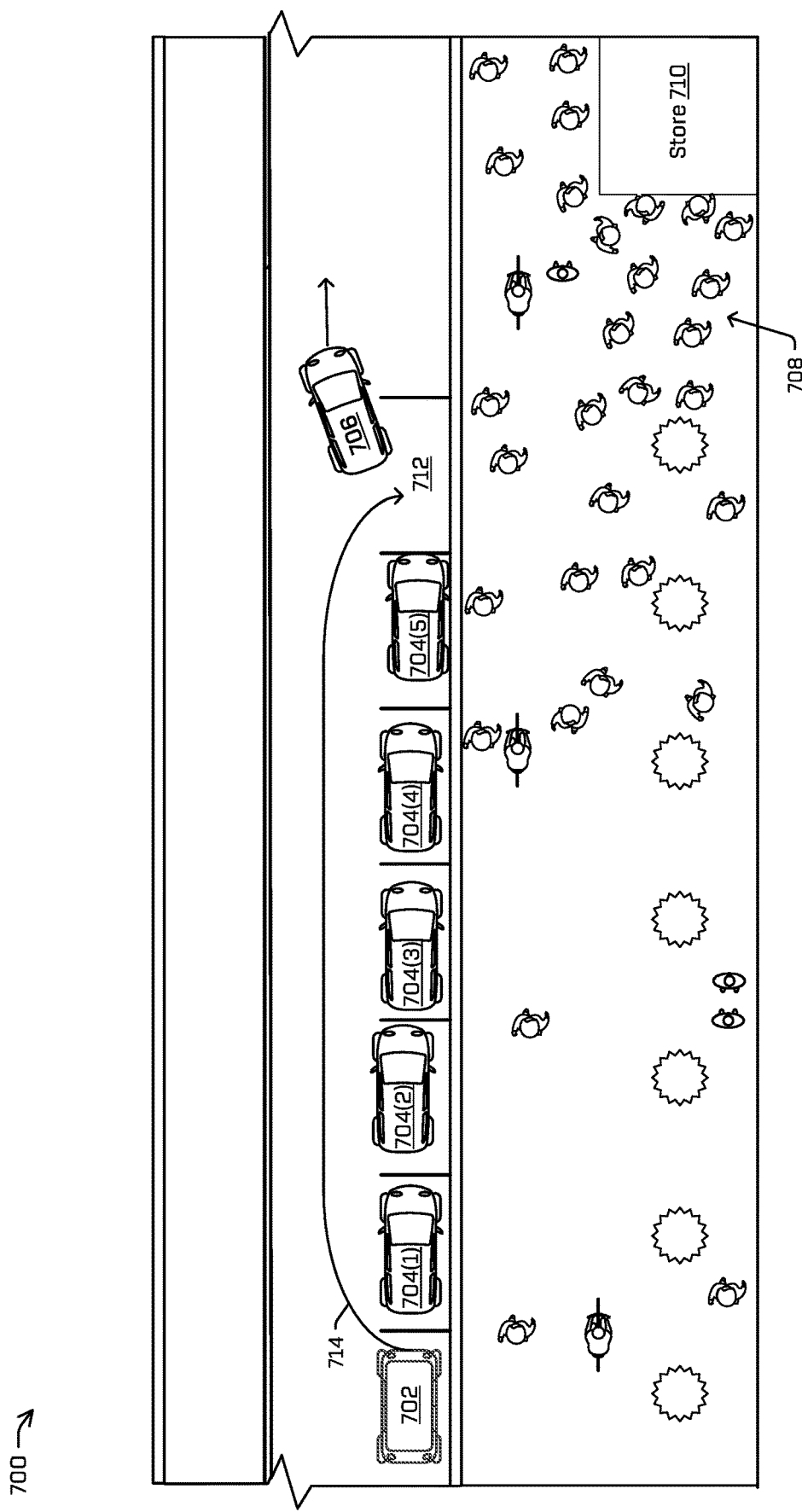
FIG. 7 illustrates an example environment in which a vehicle dynamically updates its dispensing strategy, in accordance with one or more examples of the disclosure.

FIG. 7 illustrates an example environment 700 in which a vehicle dynamically updates its dispensing strategy. Specifically, the example environment 700 depicts a vehicle 702 relocating to a better parking location due to a change in the example environment 700.

In this example, the example environment 700 may include a vehicle 702. In such examples, the vehicle 702 may be a delivery vehicle that is dispensing items to pedestrians. As shown, the vehicle 702 may be parked in a parking stall for curbside parking. Further, it is shown that the other parking stalls are occupied by other vehicles. Specifically, vehicle 704(1), vehicle 704(2), vehicle 704(3), vehicle 704(3), and vehicle 704(5) may be parked in the other parking stalls. In some examples, such vehicles may be pedestrian vehicles and/or vehicles of the fleet of vehicles.

In some examples, the vehicle 702 may be delivering items to pedestrians within the example environment 700. While delivering items to the pedestrians, the vehicle 702 may continually capture sensor data to maintain and updated representation of the example environment 700. In this example, the vehicle 702 may determine based on analyzing the recently captured sensor data, that the vehicle 706 is leaving parking stall 712. In such instances, the vehicle 702 may determine whether parking stall 712 is a better location for the vehicle 702 to deliver items. Parking stall 712 may be a better delivery location if it allows the vehicle 702 to be closer to groups of pedestrians, enables the vehicle 702 to obtain more sales, enhances pedestrian safety (e.g., moves pedestrians from a dangerous area), enhances vehicle safety, and/or other reasons.

In this example, the vehicle 702 may update its dispensing strategy. The vehicle 702 may determine that a group of pedestrians 708 may be gathered around a store 710. In such instances, the vehicle 702 may determine that the group of pedestrians 708 includes a greater pedestrian density and/or pedestrian population than what is detected near the vehicle's 702 current parking stall. Further, the vehicle 702 may determine that the parking stall 712 may enable the vehicle 702 to be located closer to the group of pedestrians 708, enhancing the potential for increased sales. As such, the vehicle 702 may follow path 714 to the parking stall 712.

Figure 8:
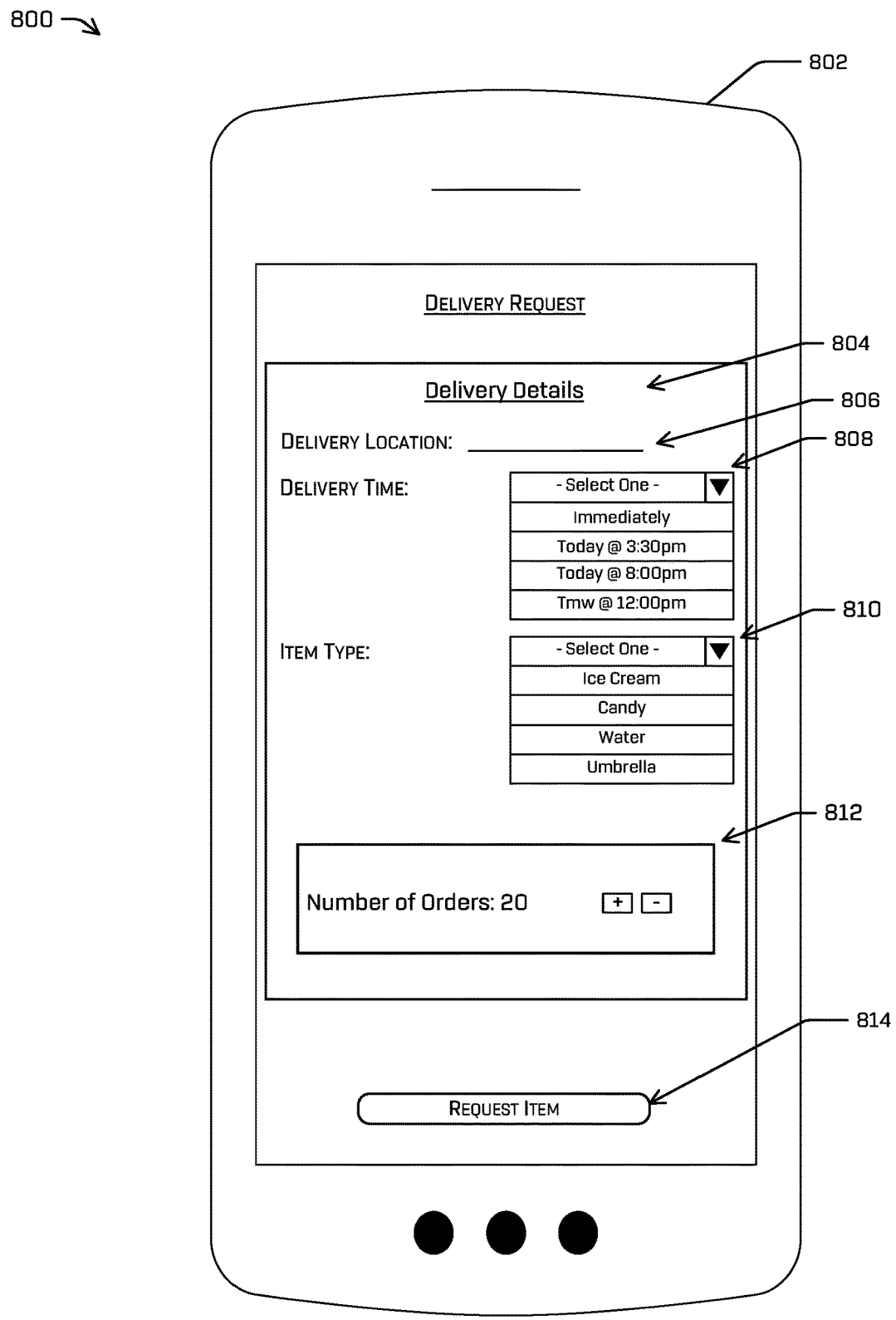
FIG. 8 depicts an example user interface of a mobile application that may be generated and rendered on a user device, in accordance with one or more examples of the disclosure.

FIG. 8 depicts an example user interface 800 that may be generated and rendered on a user device 802 in communication with a mobile application. The user interface 800 may represent a user interface generated by a ride-hailing or ride-sharing application executing on the user device 802, and configured to allow a user to request a ride from a transportation system. In some examples, user interface 800 may correspond to the user interface screens described above.

In this example, the user interface 800 includes a set of input components 804 to allow the user to provide the basic details for the delivery request. For example, the set of input components 804 may include a delivery location input field 806, a delivery time input field 808, an item type input field 810 identifying the desired item type, a number of orders input field 812, and a button 814 to submit the delivery request. The set of input components 804 includes user interface controls to allow the user to input a desired item, delivery location, and delivery time. The delivery location input field 806 includes user interface controls to allow the user to input the user's desired delivery location. Although the delivery location input field 806 may be optional, examples include a delivery location input field 806 or other components to receive the desired delivery location of pedestrians to help an item delivery system determine where to deliver items within an environment. For example, the application manager 120 may receive multiple delivery requests identifying a similar desired delivery location. Based on receiving multiple delivery requests with a similar delivery location, the application manager 120 may determine that such a location may include a threshold number of pedestrians. In at least some such examples, a notice may be sent to the pedestrian's device informing them that the request is received, will be fulfilled at a particular time/location, and/or that there is insufficient interest in the item to schedule a delivery to the region. In those examples where there is insufficient interest, an additional message may be sent to the In this example, the delivery time input field 808 includes user interface controls to allow the user to input the desired time of day for the delivered items. The application manager 120 may utilize the delivery times to further determine the predicted demand for delivery service vehicles within the region. For example, if the application manager 120 receives a single delivery request that requests an item an 3:30 PM, and receives 80 delivery requests that request an item at 8:00 PM, the application manager 120 may determine that the predicted demand for delivery service vehicles at 3:30 PM is low, while the predicted demand for delivery service vehicles at 8:00 PM is high. In such instances, the item delivery system may allocate additional vehicles for delivery service at 8:00 PM.

In some examples, the item type input field 810 includes user interface controls to allow the user to input the desired item for delivery. The application manager 120 may utilize the requested item types in order to determine what item to deliver to which delivery location. In some examples, the application manager 120 may receive a plurality of delivery requests for a first delivery location requesting a first item type, while receiving a second plurality of delivery requests for a second delivery location requesting a second item type. In this instance, the application manager 120 may stock a first delivery vehicle with the first item type and a second delivery vehicle with the second item type. In some examples, enabling users to specify their desired item type may enable the application manager 120 to select the item that is predicted to yield the greatest number of profits.

In some examples, the number of orders input field 812 includes user interface controls to allow the user to input how many items the user plans to purchase. The application manager 120 may utilize the number of orders submissions to further determine the demand for delivery service vehicles. In some instances, the application manager 120 may receive delivery requests in which the users request large numbers of orders. As such, the application manager 120 may determine that there is a high demand for delivery of the item.

Figure 9:
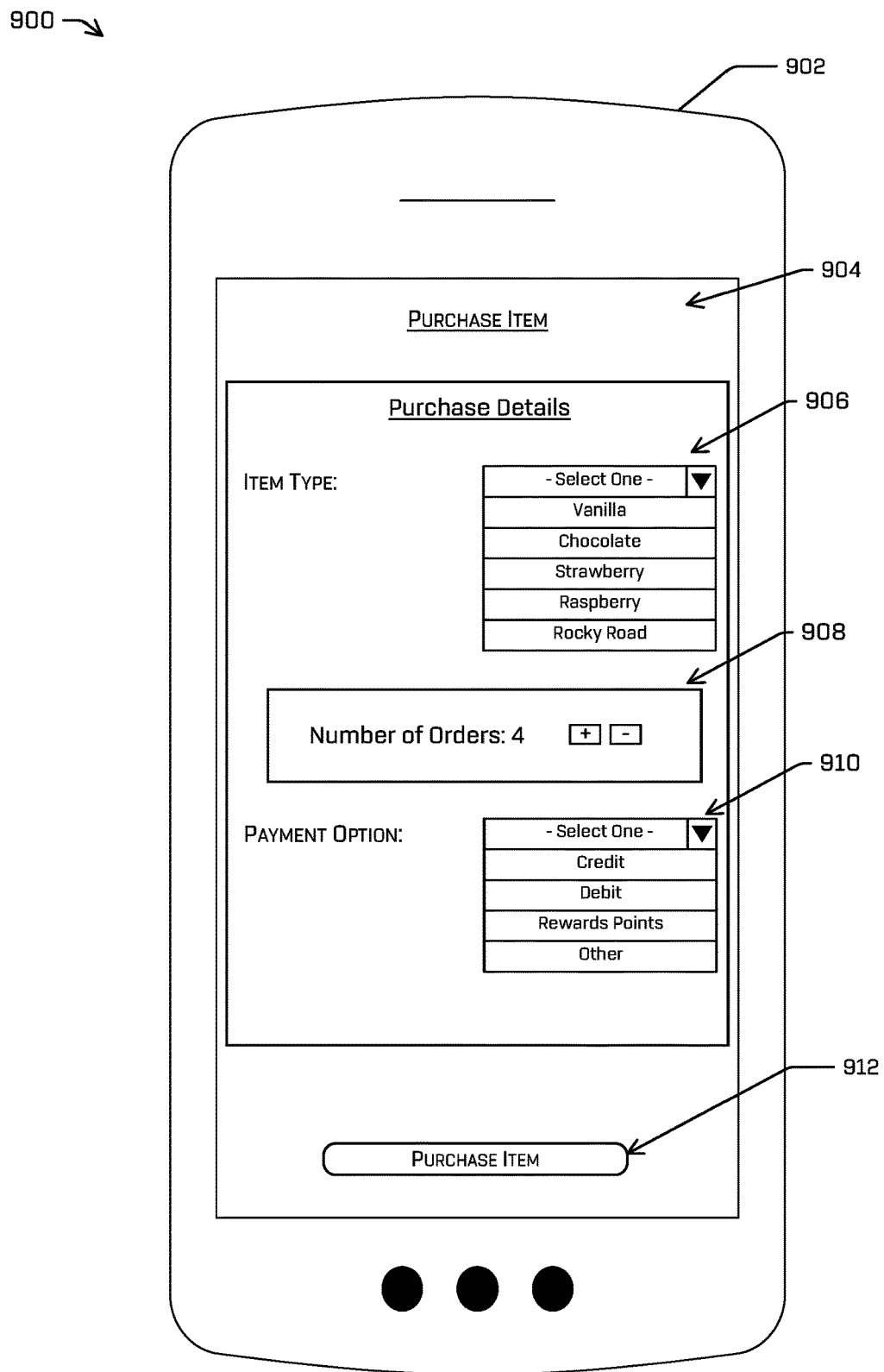
FIG. 9 depicts an example user interface of a mobile application that may be generated and rendered on a user device, in accordance with one or more examples of the disclosure.

FIG. 9 depicts an example user interface 900 that may be generated and rendered on a user device 902 in communication with a mobile application. The user interface 900 may represent a user interface generated by a ride-hailing or ride-sharing application executing on the user device 902, and configured to allow a user to request a ride from a transportation system. In some examples, user interface 900 may correspond to the user interface screens described above.

In this example, the user interface 900 includes a set of input components 904 to allow the user to provide the basic details for purchasing one or more items. For example, the set of input components 904 may include an item type input field 906, a number of orders input field 908, a payment option input field 910 identifying the desired method of payment, and a button 912 to submit the purchase request for the item stored in a delivery vehicle. The set of input components 904 includes user interface controls to allow the user to input a desired item, quantity of items, and payment method. The item input field 906 includes user interface controls to allow the user to input the user's desired item. In this example, the item that the delivery vehicle is delivering may be ice cream. In such examples, the delivery vehicle may store and deliver various flavors of ice cream. As such, when purchasing ice cream from the delivery vehicle, the user may select which flavor of ice cream to purchase. However, this example is not intended to be limiting, in other examples the item may be beverages, umbrellas, medicine, tools, clothing, etc. In such instances, users may have more or less item options. Further, in other examples, delivery vehicles may offer multiple different items (e.g., ice cream and beverages) at the same time. In such instances, the user interface 900 may provide additional input boxes for users to select from all of the available items.

In this example, the number of orders input field 908 includes user interface controls to allow the user to input how many items the user intends to purchase. The number of orders input field 908 may provide user interface controls to increase or decrease the desired quantity of orders. In this example, the user has requested to purchase "4" orders of ice cream.

In this example, the payment option input field 910 includes user interface controls to allow the user to input the method of payment for the item. As shown in FIG. 9, the payment option input field 910 may include various payment options including paying by credit, debit, rewards points, and/or other. In some examples, rewards points may be a currency maintained by the ride-sharing application. In such instances, the ride-sharing application may reward users with rewards points for performing various activities (e.g., responding to customer polls, requesting items, using the taxi service, etc.).

Figure 10:
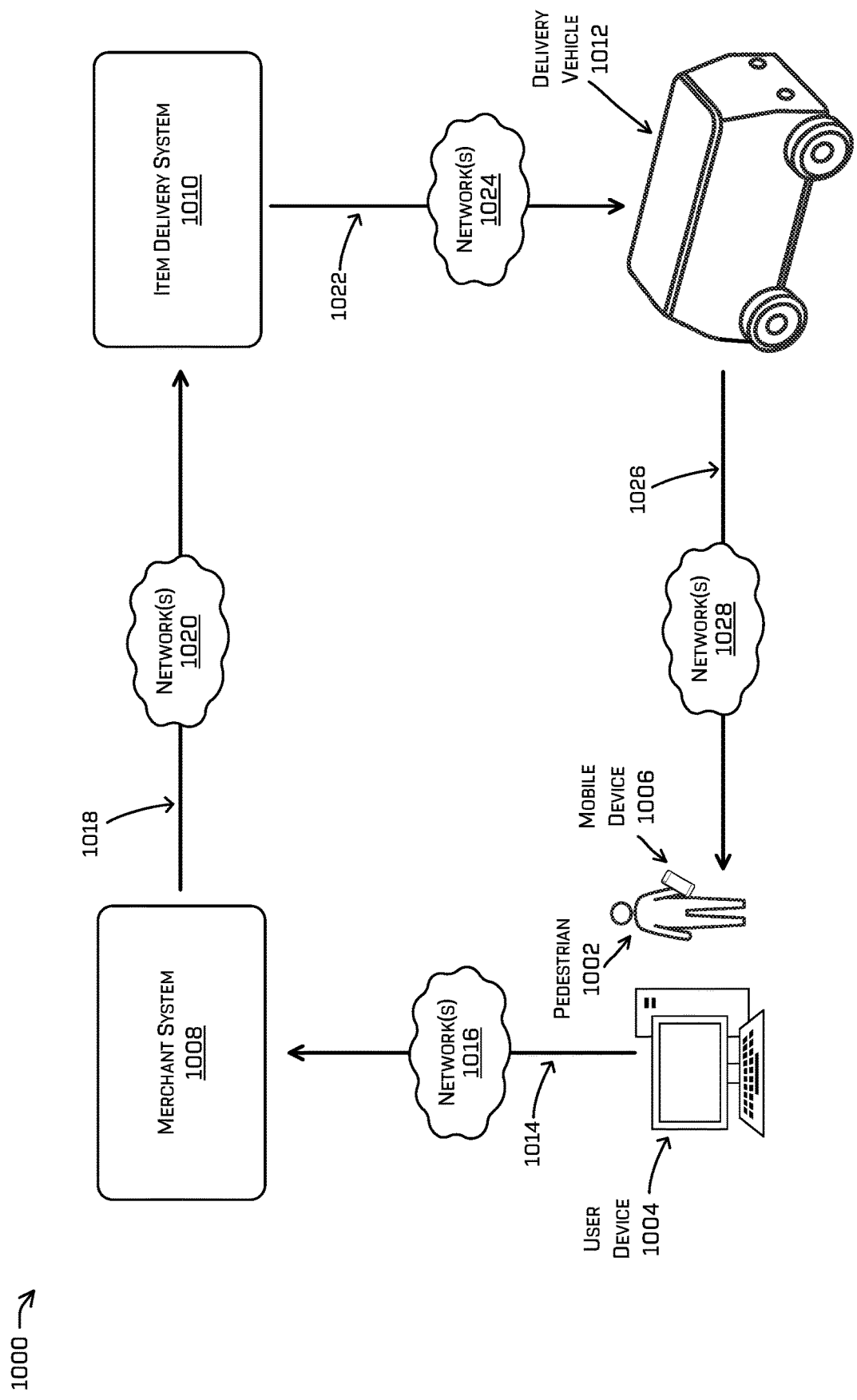
FIG. 10 is a block diagram depicting an example computing environment for implementing various techniques described herein.

FIG. 10 illustrates a block diagram of an example computing environment 1000 that implements various techniques discussed herein. For example, computing environment 1000 may be used to illustrate systems and methods of pedestrians requesting items, responding to application polls, providing payment for such items, and/or vehicles performing item deliveries. As shown in this example, a delivery to a user 1002 (also referred to as a pedestrian) may access a mobile application via a user device 1004 or mobile device 1006 to submit a request for an item or respond to a customer poll by a merchant system 1008 and/or item delivery system 1010, after which a delivery vehicle 1012 may deliver the item to the user 1002. Delivery vehicle 1012 may correspond to any of the delivery vehicles described herein, and thus may include any features or combination of features discussed above in connection with FIGS. 1-9. Merchant system 1008 and/or item delivery system 1010 may be implemented as separate computing devices or systems which operate separately from the user's mobile device 1006 and the delivery vehicle 1012, and thus may correspond to remote computing device(s) 1136 in example system 1100. Mobile device 1006 may comprise a mobile phone or other user device, such as a laptop or tablet computer, smart watch, wearable computing device, and/or any other personal computing device.

FIG. 10 illustrates a simplified delivery scenario for an item requested by a user 1002 from a merchant system 1008. At 1014, the user 1002 may request an item via a merchant system 1008. In other examples, 1014 the user 1002 may be responding to a pedestrian poll asking if a user would like a particular item. The user 1002 may use mobile device 1006 or any other computing device, to transmit the request and/or response through a network 1016 to the merchant system 1008. At 1018, the merchant system 1008 may transmit a delivery request, through network 1020, to the item delivery system 1010. In some examples, delivery request may include payment information transmitted to the item delivery system 1010, and the network 1018 through which the delivery request and/or payment information are transmitted may be a secure back-end computer network. At 1022, the item delivery system 1010 may transmit instructions to a delivery vehicle 1012 to transition to a delivery service vehicle, retrieve the requested item (e.g., from a fulfillment center, supply facility, or warehouse) and then deliver the item to pedestrians within the location. Transmissions between the item delivery system 1010 and delivery vehicle 1012 may be sent via network 1024, which may include one or more cellular networks and/or other secure wireless networks. Finally, at 1026, the delivery vehicle 1012 may navigate to and park at a delivery location, where the vehicle may be accessible to the pedestrians within the region, specifically user 1002. As discussed below in more detail, the delivery vehicle 1012 may communicate with the user's mobile device 1006 directly or via the item delivery system 1010 or merchant system 1008 during the item delivery process to inform the user 1002 that the delivery vehicle 1012 will be delivering the pedestrian's requested item within a region. In some examples, such systems may communicate to the user 1002 that the user 1002 has been awarded rewards points for providing the request (e.g., free item, rewards points for purchasing an item, etc.). Transmissions between the delivery vehicle 1012 and the user's mobile device 1006 may be send via one or more wireless networks 1028, such as a cellular or WLAN networks for longer-range communications and/or Bluetooth, WiFi, or NFC for short-range communications.

Although FIG. 10 is depicted with unidirectional arrows to illustrate the simple item requesting, polling, delivery, and/or payment process outlined above, it should be understood that each device and system in this example may perform bi-directional communications with any or all other devices and systems. Additional process features and device interactions not depicted in this example may be performed in other examples, such as modifications or cancelations of delivery requests, proximity notifications, etc.

Additionally, although the merchant system 1008 and item delivery system 1010 are depicted as separate computing systems in FIG. 10, in other examples two or more of these systems may be implemented as a single computing system. For instance, a merchant system 1008 may include components to perform item delivery functionality, including delivery vehicle allocations, route determinations, and delivery vehicle dispatch and control. In still other examples, a merchant system 1008 need not be involved at all in an item delivery scenario. Further, although the item delivery system 1010 may be implemented as a centralized computing system configured to communicate with and control delivery vehicle 1012 (or a fleet of delivery vehicles) as shown in this example, in other examples, any or all of features and functionalities of the item delivery system 1010 may be integrated into a delivery vehicle 1012.

Figure 11:
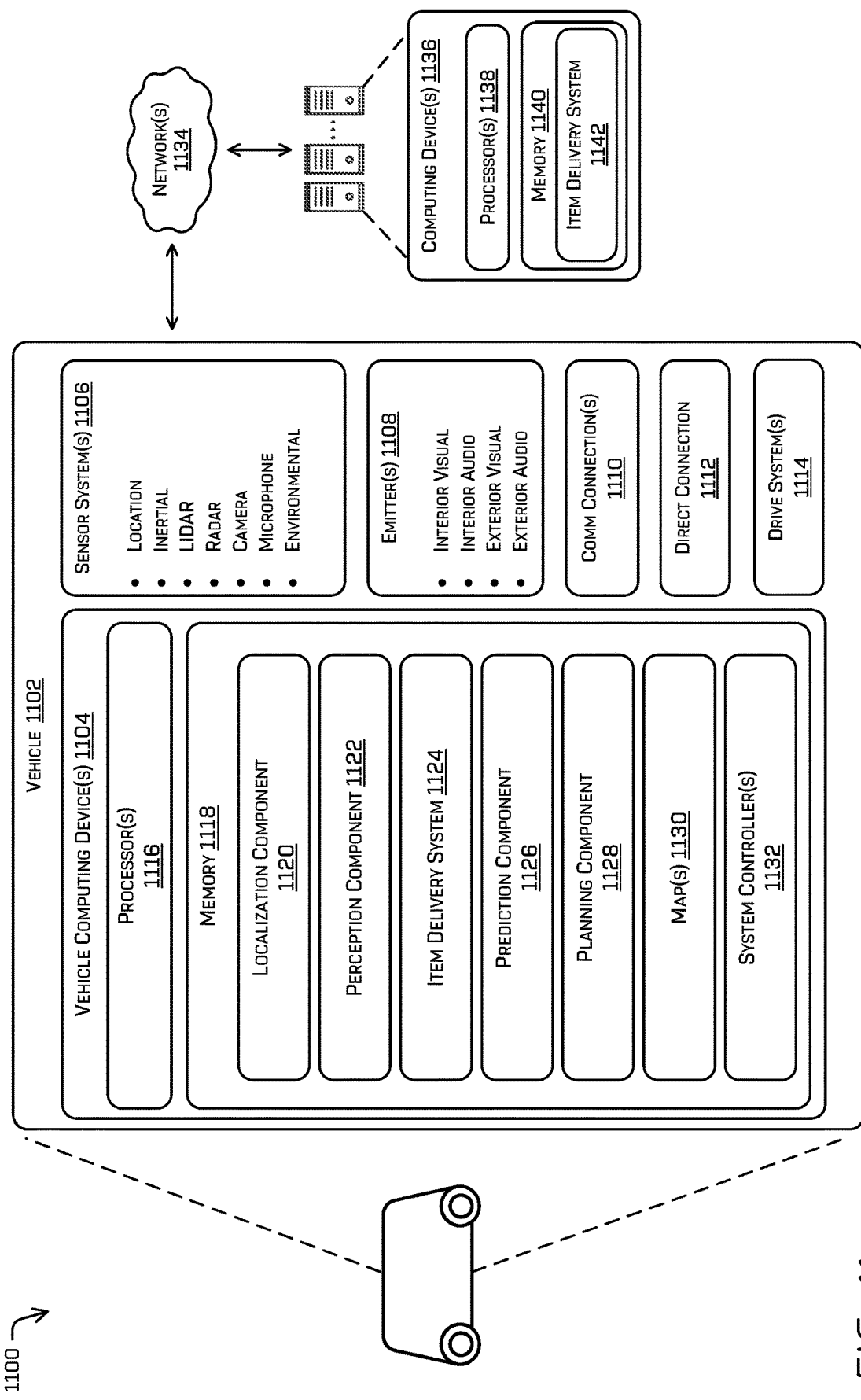
FIG. 11 is a block diagram of an example system for implementing the techniques described herein.

FIG. 11 is a block diagram of an example system 1100 for implementing the techniques described herein. In at least one example, the system 1100 may include a vehicle, such as vehicle 1102. The vehicle 1102 may include one or more vehicle computing devices 1104, one or more sensor systems 1106, one or more emitters 1108, one or more communication connections 1110, at least one direct connection 1112, and one or more drive systems 1114.

The vehicle computing device 1104 may include one or more processors 1116 and memory 1118 communicatively coupled with the processor(s) 1116. In the illustrated example, the vehicle 1102 is an autonomous vehicle; however, the vehicle 1102 could be any other type of vehicle, such as a semi-autonomous vehicle, or any other system having at least an image capture device (e.g., a camera-enabled smartphone). In some instances, the autonomous vehicle 1102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 1102 may be a fully or partially autonomous vehicle having any other level or classification.

In the illustrated example, the memory 1118 of the vehicle computing device 1104 stores a localization component 1120, a perception component 1122 including an item delivery system 1124, a prediction component 1126, a planner component 1128, one or more system controllers 1132, and one or more maps 1130 (or map data). Though depicted in FIG. 11 as residing in the memory 1118 for illustrative purposes, it is contemplated that the localization component 1120, the perception component 1122 including the one or more item delivery system(s) 1124, the prediction component 1126, the planner component 1128, system controller(s) 1132, and/or the map(s) may additionally, or alternatively, be accessible to the vehicle 1102 (e.g., stored on, or otherwise accessible by, memory remote from the vehicle 1102, such as, for example, on memory 1140 of one or more computing device 1136). In some examples, the memory 1140 may include an item delivery system 1142.

In at least one example, the localization component 1120 may include functionality to receive sensor data from the sensor system(s) 1106 to determine a position and/or orientation of the vehicle 1102 (e.g., one or more of an x-, y-, z-position, roll, pitch, or yaw). For example, the localization component 1120 may include and/or request/receive a map of an environment, such as from map(s) 1130, and may continuously determine a location and/or orientation of the vehicle 1102 within the environment. In some instances, the localization component 1120 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 1102. In some instances, the localization component 1120 may provide data to various components of the vehicle 1102 to determine an initial position of the vehicle 1102 for determining the relevance of an object to the vehicle 1102, as discussed herein.

In some instances, the perception component 1122 may include functionality to perform object detection, segmentation, and/or classification. In some examples, the perception component 1122 may provide processed sensor data that indicates a presence of an object (e.g., entity) that is proximate to the vehicle 1102 and/or a classification of the object as an object type (e.g., car, pedestrian, cyclist, animal, building, tree, road surface, curb, sidewalk, unknown, etc.). In some examples, the perception component 1122 may provide processed sensor data that indicates a presence of a stationary entity that is proximate to the vehicle 1102 and/or a classification of the stationary entity as a type (e.g., building, tree, road surface, curb, sidewalk, unknown, etc.). In additional or alternative examples, the perception component 1122 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The item delivery system 1124 may be perform any of the techniques described with respect to any of FIGS. 1-10 above with respect identifying optimal delivery locations and/or deliver physical items to pedestrians.

The prediction component 1126 may generate one or more probability maps representing prediction probabilities of possible locations of one or more objects in an environment. For example, the prediction component 1126 may generate one or more probability maps for vehicles, pedestrians, animals, and the like within a threshold distance from the vehicle 1102. In some instances, the prediction component 1126 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 1126 may generate predicted trajectories of objects (e.g., objects) in an environment. For example, the prediction component 1126 may generate one or more predicted trajectories for objects within a threshold distance from the vehicle 1102. In some examples, the prediction component 1126 may measure a trace of an object and generate a trajectory for the object based on observed and predicted behavior.

In general, the planner component 1128 may determine a path for the vehicle 1102 to follow to traverse through an environment. For example, the planner component 1128 may determine various routes and trajectories and various levels of detail. For example, the planner component 1128 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 1128 may generate an instruction for guiding the vehicle 1102 along at least a portion of the route from the first location to the second location. In at least one example, the planner component 1128 may determine how to guide the vehicle 1102 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 1128 may select a trajectory for the vehicle 1102.

In other examples, the planner component 1128 may alternatively, or additionally, use data from the localization component 1120, the perception component 1122, and/or the prediction component 1126 to determine a path for the vehicle 1102 to follow to traverse through an environment. For example, the planner component 1128 may receive data (e.g., object data) from the localization component 1120, the perception component 1122, and/or the prediction component 1126 regarding objects associated with an environment. In some examples, the planner component 1128 receives data for relevant objects within the environment. Using this data, the planner component 1128 may determine a route to travel from a first location (e.g., a current location) to a second location (e.g., a target location) to avoid objects in an environment. In at least some examples, such a planner component 1128 may determine there is no such collision-free path and, in turn, provide a path that brings vehicle 1102 to a safe stop avoiding all collisions and/or otherwise mitigating damage.

In at least one example, the vehicle computing device 1104 may include one or more system controllers 1132, which may be configured to control steering, propulsion, braking, safety, emitters, communication, and other systems of the vehicle 1102. The system controller(s) 1132 may communicate with and/or control corresponding systems of the drive system(s) 1114 and/or other components of the vehicle 1102.

The memory 1118 may further include one or more maps 1130 that may be used by the vehicle 1102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 1102 may be controlled based at least in part on the map(s) 1130. That is, the map(s) 1130 may be used in connection with the localization component 1120, the perception component 1122, the prediction component 1126, and/or the planner component 1128 to determine a location of the vehicle 1102, detect objects in an environment, generate routes, determine actions and/or trajectories to navigate within an environment.

In some examples, the one or more maps 1130 may be stored on a remote computing device(s) (such as the computing device(s) 1136) accessible via network(s) 1134. In some examples, multiple maps 1130 may be stored based on, for example, a characteristic (e.g., type of entity, time of day, day of week, season of the year, etc.). Storing multiple maps 1130 may have similar memory requirements, but increase the speed at which data in a map may be accessed.

In some instances, aspects of some or all of the components discussed herein may include any models, techniques, and/or machine-learned techniques. For example, in some instances, the components in the memory 1118 (and the memory 1140, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 1106 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 1106 may include multiple instances of each of these or other types of sensors. For instance, the lidar sensors may include individual lidar sensors located at the corners, front, back, sides, and/or top of the vehicle 1102. As another example, the camera sensors may include multiple cameras disposed at various locations about the exterior and/or interior of the vehicle 1102. The sensor system(s) 1106 may provide input to the vehicle computing device 1104. Additionally, or in the alternative, the sensor system(s) 1106 may send sensor data, via the one or more networks 1134, to the one or more computing device(s) 1136 at a particular frequency, after a lapse of a predetermined period of time, in near real-time, etc.

The vehicle 1102 may also include one or more emitters 1108 for emitting light and/or sound. The emitter(s) 1108 may include interior audio and visual emitters to communicate with passengers of the vehicle 1102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 1108 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1102 may also include one or more communication connections 1110 that enable communication between the vehicle 1102 and one or more other local or remote computing device(s). For instance, the communication connection(s) 1110 may facilitate communication with other local computing device(s) on the vehicle 1102 and/or the drive system(s) 1114. Also, the communication connection(s) 1110 may allow the vehicle to communicate with other nearby computing device(s) (e.g., computing device 1136, other nearby vehicles, etc.) and/or one or more remote sensor system(s) for receiving sensor data. The communications connection(s) 1110 also enable the vehicle 1102 to communicate with a remote teleoperations computing device or other remote services.

The communications connection(s) 1110 may include physical and/or logical interfaces for connecting the vehicle computing device 1104 to another computing device or a network, such as network(s) 1134. For example, the communications connection(s) 1110 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 1102 may include one or more drive systems 1114. In some examples, the vehicle 1102 may have a single drive system 1114. In at least one example, if the vehicle 1102 has multiple drive systems 1114, individual drive systems 1114 may be positioned on opposite ends of the vehicle 1102 (e.g., the front and the rear, etc.). In at least one example, the drive system(s) 1114 may include one or more sensor systems to detect conditions of the drive system(s) 1114 and/or the surroundings of the vehicle 1102. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 1114. In some cases, the sensor system(s) on the drive system(s) 1114 may overlap or supplement corresponding systems of the vehicle 1102 (e.g., sensor system(s) 1106).

The drive system(s) 1114 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1114 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 1114. Furthermore, the drive system(s) 1114 may also include one or more communication connection(s) that enable communication by the respective drive module with one or more other local or remote computing device(s).

In at least one example, the direct connection 1112 may provide a physical interface to couple the one or more drive system(s) 1114 with the body of the vehicle 1102. For example, the direct connection 1112 may allow the transfer of energy, fluids, air, data, etc. between the drive system(s) 1114 and the vehicle. In some instances, the direct connection 1112 may further releasably secure the drive system(s) 1114 to the body of the vehicle 1102.

In at least one example, the localization component 1120, the perception component 1122, the item delivery system 1124, the prediction component 1126, the planner component 1128, the one or more system controllers 1132, and the one or more maps 1130 may process sensor data, as described above, and may send their respective outputs, over the one or more network(s) 1134, to the computing device(s) 1136. In at least one example, the localization component 1120, the perception component 1122, the item delivery system 1124, the prediction component 1126, the planner component 1128, the one or more system controllers 1132, and the one or more maps 1130 may send their respective outputs to the computing device(s) 1136 at a particular frequency, after a lapse of a predetermined period of time, in near real-time, etc.

In some examples, the vehicle 1102 may send sensor data to the computing device(s) 1136 via the network(s) 1134. In some examples, the vehicle 1102 may receive sensor data from the computing device(s) 1136 and/or remote sensor system(s) via the network(s) 1134. The sensor data may include raw sensor data and/or processed sensor data and/or representations of sensor data. In some examples, the sensor data (raw or processed) may be sent and/or received as one or more log files.

The computing device(s) 1136 may include processor(s) 1138 and a memory 1140, which may include an item delivery system 1142. In some examples, the memory 1140 may store one or more of components that are similar to the component(s) stored in the memory 1118 of the vehicle 1102. In such examples, the computing device(s) 1136 may be configured to perform one or more of the processes described herein with respect to the vehicle 1102. In some examples, the item delivery system 1142 may perform substantially similar functions as the item delivery system 1124.

The processor(s) 1116 of the vehicle 1102 and the processor(s) 1138 of the computing device(s) 1136 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 1118 and memory 1140 are examples of non-transitory computer-readable media. The memory 1118 and memory 1140 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 11 is illustrated as a distributed system, in alternative examples, components of the vehicle 1102 may be associated with the computing device(s) 1136 and/or components of the computing device (s) 1136 may be associated with the vehicle 1102. That is, the vehicle 1102 may perform one or more of the functions associated with the computing device(s) 1136, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 12:
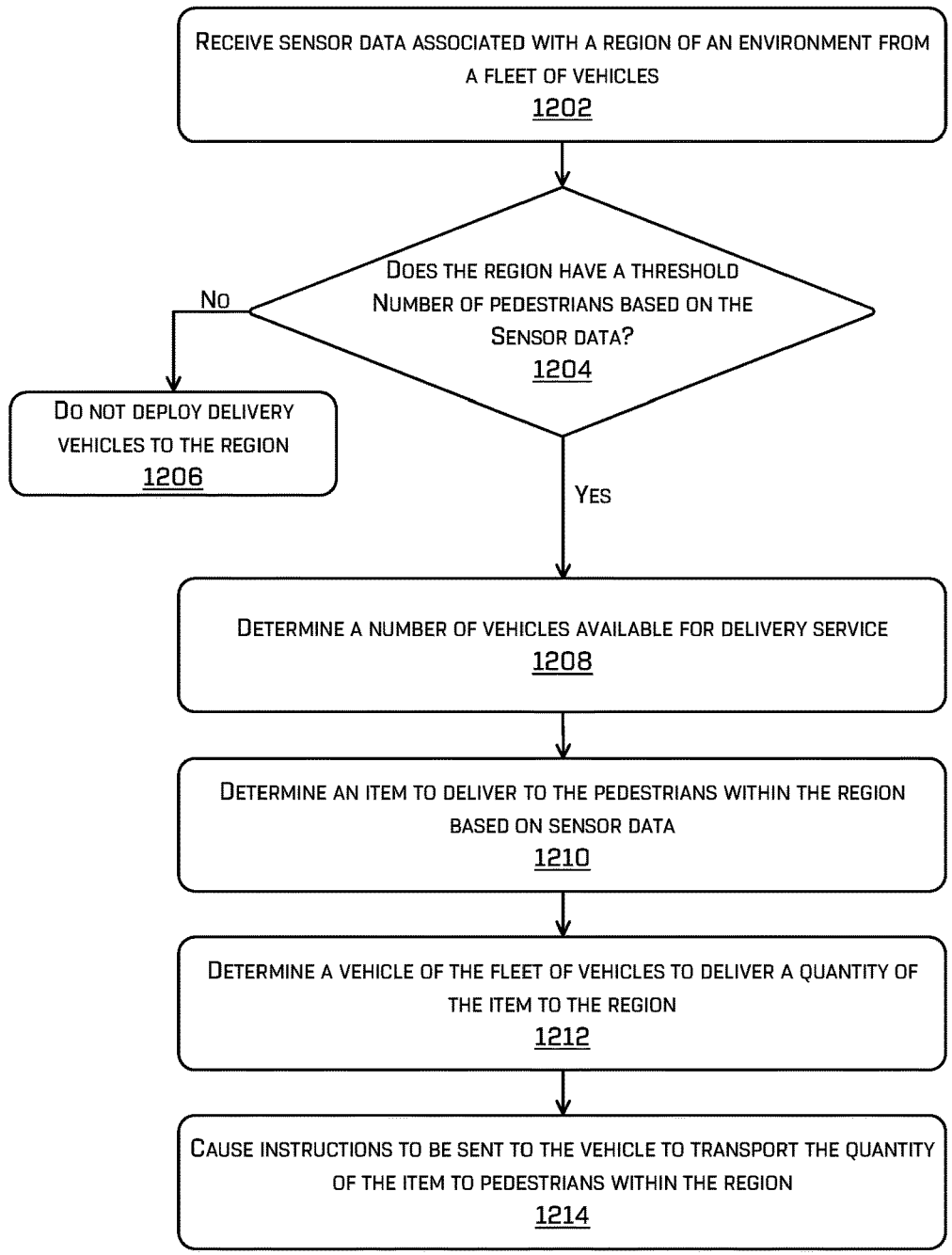
FIG. 12 is a flow diagram illustrating an example process of receiving sensor data from a fleet of vehicles, determining a region of the environment with a threshold level of customers, and causing a vehicle to deliver a quantity of an item to customers within the region, in accordance with one or more examples of the disclosure.

FIG. 12 is a flow diagram illustrating an example process 1200 of receiving sensor data from a fleet of vehicles, determining a region of the environment with a threshold level of pedestrians, and causing a vehicle to deliver a quantity of an item to pedestrians within the region. As described below, process 1200 may be performed by one or more computer-based components configured to implement various functionalities described herein. For instance, some or all of the operations of process 1200 may be performed by an item delivery system configured to receive sensor data, determine delivery locations based on pedestrian data, and/or allocating vehicles to deliver items to the delivery location. As described above, the item delivery system may be integrated as a separate server-based system in some examples. However, in other examples, the item delivery system may be integrated as an on-vehicle system.

Process 1200 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 1202, the item delivery service may receive sensor data associated with a region of an environment from a fleet of vehicles. Additionally, or alternatively, such data may further comprise user responses, environmental conditions, etc. As described above, a fleet management system may be configured to deploy and/or manage a fleet of vehicles. In some examples, the fleet management system may receive sensor data from vehicles (e.g., both taxi service vehicles and/or delivery service vehicles) within the fleet of vehicles as vehicles traverse the environment. In some instances, the sensor data may provide a recent representation (e.g., captured within a threshold period of time (e.g., within 4 hours, 2 hours, 1 hour, 30 minutes, 1 minute, etc.)) of the environment.

At operation 1204, the item delivery system may determine whether the region has a threshold number of pedestrians based on the sensor data. The fleet manager may determine a region to deliver items based on evaluating the sensor data to detect pedestrians within the environment. For example, the fleet manager may identify one or more regions within the environment that have a threshold number of pedestrians. In such instances, the threshold may be determined based on a number of different factors, such as location data, historical data, and/or forecast data.

In some examples, location data may include the type of city (e.g., small town, large metropolitan city, etc.) from which the sensor data was captured, the types of travel used in the region (e.g., public transportation, personal vehicles, one-way roads, freeways, etc.), etc. In some examples, historical data may include a density of pedestrians within the region, a number of pedestrians within the region, a pattern of traffic for the time of day within the region, a pattern of traffic for the time of week within the region, a number of previous sales within the region, an amount of mobile application use within the region, etc. In some examples, forecast data may include current weather within the region, predicted weather within the region, event data (e.g., known events within the region), etc.

If the region does not have a threshold number of pedestrians (1204:No), then the item delivery system may not deploy delivery vehicles to the region. At operation 1206, the item delivery system may determine to not deploy delivery vehicles to the region. In such instances, the item delivery system may determine that the vehicles may be more productively used in a different service and/or region. In at least some such examples, a message may be sent to users who indicated an interest that the vehicle will not be deployed and to suggest an alternate time/location.

Conversely, if the region has a threshold number of pedestrians (1204:Yes), then the item delivery system may determine a number of vehicles available for delivery service. At operation 1208, the item delivery system may determine how many vehicles of the fleet of vehicles are available to render a delivery service to pedestrians within the region. In some examples, the item delivery system may determine a number of vehicles available for deliver service based on comparing a predicted demand for taxi services within the region with a predicted demand for delivery services within the region. In such instances, the predicted demand may be based on the amount of money the particular service (e.g., taxi service, delivery service, etc.) is estimated to make within a threshold period of time (e.g., one hour, two hours, 6 hours, 24 hours, etc.). Such determinations may be based on historical data for the region, sensor data from the region, and/or forecast data for the region. As a result of such, one or more commands may be given to transition between delivery and/or taxi service operations of vehicles of the fleet of vehicles.

At operation 1210, the item delivery system may determine an item to deliver to pedestrians within the region. The item delivery system may determine one or more varieties of items to deliver to pedestrians within the region. Such items may include ice cream, beverages (e.g., water, soda, etc.), umbrellas, candy, snacks, food, medicine, clothing, tools, first aid equipment, and/or any other items. In some instances, determining an item to deliver may be based on the item delivery system evaluating historical data, sensor data, forecast data, user responses from mobile applications, and/or other datasets. The item delivery system may select an item to deliver which may be predicted to yield the greatest number of sales and/or profits.

At operation 1212, the item delivery system may determine a vehicle of the fleet of vehicles to deliver a quantity of the item to the region. The item delivery system may select any number of available vehicles of the fleet to deliver the items to the region. In some instances, determining which vehicles to commit to delivery, and how many vehicles to commit to delivery, may be based on a number of factors, such as the vehicle's proximity to the region and/or the fulfilment center, the vehicle's current service type (e.g., taxi service vehicle or delivery service vehicle), the vehicle's remaining power compared with the estimated delivery time, and/or other factors. In such examples, if the potential vehicle is a delivery service vehicle, the item delivery system may determine the item currently stocked within the vehicle, the quantity of the stocked item, and/or other considerations. If the potential vehicle is a taxi service vehicle, the fleet manager may determine the vehicle's status (e.g., currently providing ride to user, in-route to pick up user, waiting for ride request, etc.). Based on such factors, the item delivery system may weigh some or all of the above listed factors and may select one or more vehicles to deliver the items to pedestrians within the region.

At operation 1214, the item delivery system may cause instructions to be sent to the vehicle to transport the quantity of the item to pedestrians within the region. Instructions may differ based on a number of different factors. For example, if the selected vehicle is a taxi service vehicle, the instructions may include instructions to navigate to a fulfillment center to retrieve a quantity of the item, receive a particular type of modular storage unit within which the items may be stored, and/or navigate to the region to deliver the items. In other examples, if the selected vehicle is a delivery service vehicle, the instructions may include instructions to navigate to a fulfillment center to retrieve a quantity of the item (e.g., based on the vehicle having a different item or based on the vehicle having a low inventory of the desired item) and navigate to the region for delivery. In some instances, the instructions may provide a specific location within the region to which the vehicle may navigate and dispense (e.g., sell) the items. In other examples, the instructions may provide a general location within the region to which the vehicle may navigate. In such examples, upon arriving at the general location, the vehicle may determine a dispensing strategy that includes a specific location to deliver the items.

Figure 13:
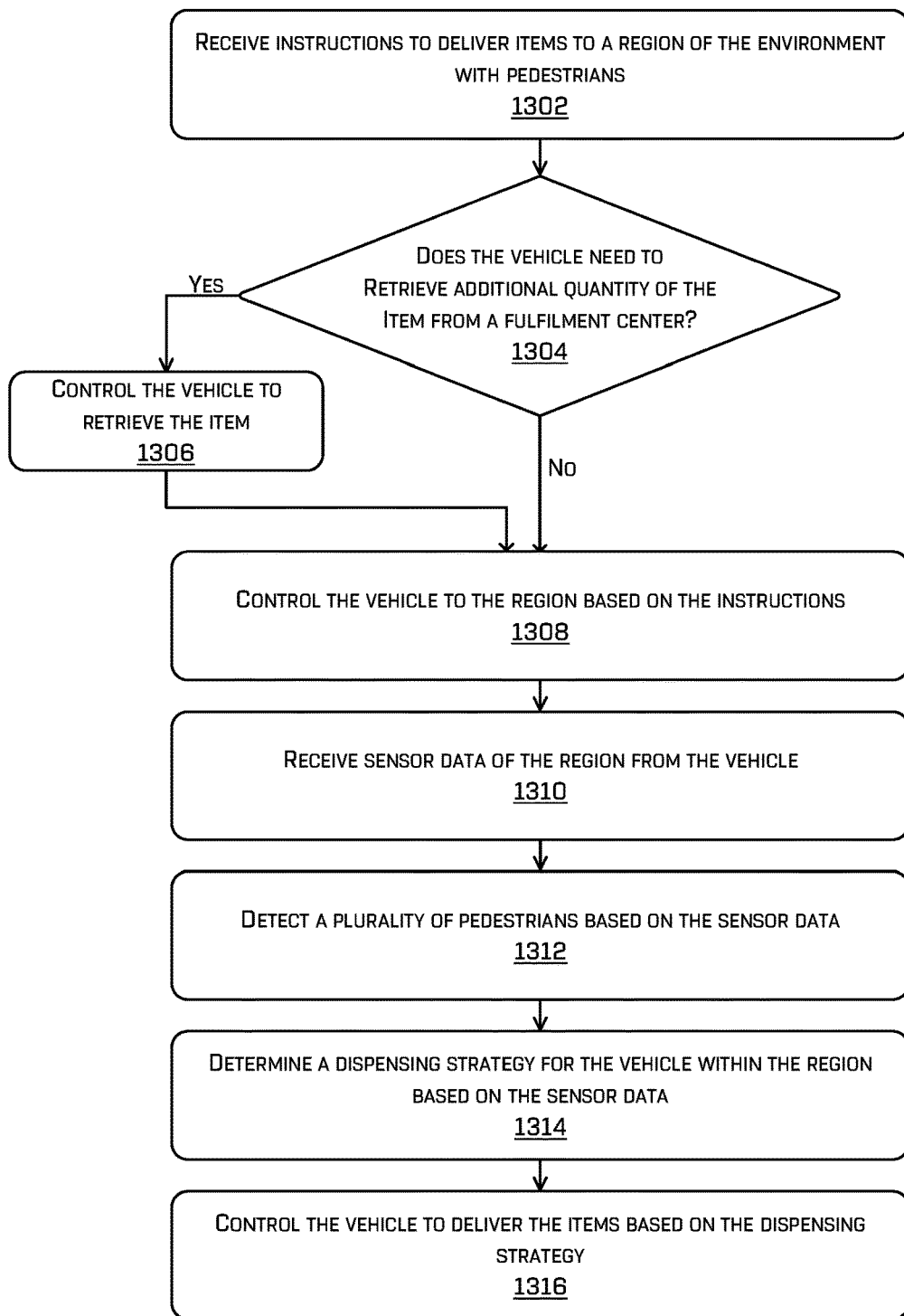
FIG. 13 is a flow diagram illustrating an example process of receiving instructions from a remote system, controlling the vehicle to the region indicated in the instructions, determining a dispensing strategy, and controlling the vehicle to deliver a quantity of an item based on the dispensing strategy, in accordance with one or more examples of the disclosure.

FIG. 13 is a flow diagram illustrating an example process 1300 of receiving instructions from a remote system, controlling the vehicle to the region indicated in the instructions, determining a dispensing strategy, and controlling the vehicle to deliver a quantity of an item based on the dispensing strategy. As described below, process 1300 may be performed by one or more computer-based components configured to implement various functionalities described herein. For instance, some or all of the operations of process 1300 may be performed by an item delivery system configured to receive an instruction, control the vehicle to a region, and/or deliver items to pedestrians based on a dispensing strategy. As described above, the item delivery system may be integrated as an on-vehicle system in some examples. However, in other examples, the item delivery system may be integrated as a separate server-based system.

Process 1300 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 1302, the item delivery system may receive instructions to deliver items to a region of the environment with pedestrians. As described above, the vehicle may receive instructions from a remote computing device, a fleet management system. In some examples, the fleet management system may deploy and/or manage the actions of numerous vehicles.

At operations 1304, the item delivery system may determine whether the vehicle needs to retrieve additional quantity of the item from a fulfilment center. In some examples, if the vehicle was previously a taxi service vehicle, the instructions may include instructing the vehicle to navigate to a fulfillment center to retrieve the items, and subsequently to deliver the items to pedestrians within the region. If the vehicle was previously a delivery vehicle, the instructions may include instructing the vehicle to navigate directly to the region. As such, if the instructions indicate that the vehicle needs to retrieve additional quantity of the item from a fulfilment center (1304:Yes), the vehicle may navigate to the fulfillment center. At operation 1306, the vehicle may be controlled to retrieve the item and/or modify the vehicle to carry the desired quantity of items. In such instances, the fulfillment center may provide a storage unit and/or a quantity of items to be stored therein. In such instances, the item type may be based on the instructions.

In contrast, if the vehicle does not need additional quantity of the item from a fulfillment center (1304:No), then the vehicle may be controlled to navigate directly to the region based on the instructions. At operation 1308, the vehicle may navigate to the region. In such instances, the instructions may provide a path for the vehicle to follow. Further, the instructions may provide a delivery location within the region. As such, the vehicle may traverse the environment following the path to the delivery location.

At operation 1310, the item delivery system may receive sensor data of the region. As described above, upon arriving to and/or within the region, the vehicle may receive sensor data of the environment. The vehicle may include multiple sensor devices configured to receive unique sensor data representative of the perspective of the sensor device. Such sensor devices may include radar devices, lidar devices, image capturing devices, time-of-flight devices, etc. In such instances, the sensor data may be captured within a threshold period of time (e.g., 1 second, 5 seconds, 1 minute, 10 minutes, etc.).

At operation 1312, the item delivery system may detect a plurality of pedestrians based on the sensor data. In some examples, the item delivery system may detect groups and/or groupings of pedestrians within the region based on the sensor data. The item delivery system may determine where the groups of pedestrians are located within the region.

At operation 1314, the item delivery system may determine a dispensing strategy for the vehicle within the region based on the sensor data. In some examples, the vehicle may determine a dispensing strategy describing how the vehicle may deliver the goods to the plurality of pedestrians within the region. In such instances, the dispensing strategy may be based on a number of factors including historical data for the region, forecast data, and/or region characteristic data. Such region characteristic data may include location information (e.g., city type, type of travel within the region (e.g., public transportation, one way streets, etc.)), pedestrian density, pedestrian movement (e.g., where and how pedestrians are moving), zoning regulations, local laws, pedestrian safety, etc. The vehicle may analyze such data to determine the dispensing strategy. In determining the dispensing strategy, the vehicle may consider whether to deliver the items from a fixed location or while driving around the region. Further, the vehicle may also consider targeting specific pedestrians.

At operation 1316, the item delivery system may control the vehicle to deliver the items based on the dispensing strategy. As described above, the vehicle may deliver the items within the region according to the methods described in the dispensing strategy. In such instances, the vehicle may begin to traverse the environment according to the dispensing strategy.

Example Clauses

A: A system comprising: one or more processors; and one or more non-transitory computer-readable media storing computer-executable instructions that, when executed, cause the one or more processors to perform operations comprising: receiving an instruction to deliver a quantity of an item to a region of an environment with pedestrians; navigating a vehicle to the region; receiving, from a sensor device associated with the vehicle, sensor data from the vehicle within the region; detecting, based at least in part on the sensor data, a location of a pedestrian proximate the vehicle and an indication of whether the pedestrian is associated with the item; determining, based at least in part on the location and the indication, a dispensing strategy for the vehicle within the region; and controlling, based at least in part on the dispensing strategy, the vehicle to deliver the item.

B: The system of paragraph A, wherein determining the dispensing strategy is based at least in part on one or more of: a density of the pedestrians; a movement of the pedestrians; zoning regulations; or a location type.

C: The system of paragraph A, wherein the indication comprises a determination that the pedestrian is without the item, the operations further comprising one or more of: causing speakers to output directional sound towards the pedestrian, or causing visual emitters to output directional light towards the pedestrian.

D: The system of paragraph A, wherein the sensor data is first sensor data captured at a first time, further comprising: receiving, from the sensor device, second sensor data from the vehicle within the region, wherein the second sensor data is captured at a second time after the first time; determining, based at least in part on the second sensor data, a change in the environment; determining, based at least in part on the change in the environment, an updated dispensing strategy for the vehicle within the region; and controlling, based at least in part on the updated dispensing strategy, the vehicle to deliver the quantity of the item.

E: One or more non-transitory computer-readable media storing instructions executable by one or more processors, wherein the instructions, when executed, cause the one or more processors to perform operations comprising: receiving an instruction to deliver a quantity of an item to a region of an environment with pedestrians; receiving sensor data from within the region; detecting, based at least in part on the sensor data, a location of a pedestrian proximate a vehicle and an indication of whether the pedestrian is associated with the item; determining, based at least in part on the location and the indication, a dispensing strategy for the vehicle within the region; and controlling, based at least in part on the dispensing strategy, the vehicle to deliver the item.

F: The one or more non-transitory computer-readable media of paragraph E, wherein determining the dispensing strategy is based at least in part on one or more of: a density of the pedestrians; a movement of the pedestrians; zoning regulations; or a location type.

G: The one or more non-transitory computer-readable media of paragraph E, wherein the indication comprises a determination that the pedestrian is without the item, the operations further comprising one or more of: causing speakers to output directional sound towards the pedestrian; or causing visual emitters to output directional light towards of pedestrian.

H: The one or more non-transitory computer-readable media of paragraph E, wherein the sensor data is first sensor data captured at a first time, wherein the operations further comprise: receiving, from a sensor device, second sensor data from the vehicle within the region, wherein the second sensor data is captured at a second time after the first time; determining, based at least in part on the second sensor data, a change in the environment; determining, based at least in part on the change in the environment, an updated dispensing strategy for the vehicle within the region; and controlling, based at least in part on the updated dispensing strategy, the vehicle to deliver the quantity of the item.

I: The one or more non-transitory computer-readable media of paragraph E, wherein the operations further comprise: receiving information from the pedestrian via a user device associated with the pedestrian, the information indicative of a request for the item, wherein controlling the vehicle to deliver the quantity of the item is further based at least in part on the information.

J: The one or more non-transitory computer-readable media of paragraph E, wherein the operations further comprise: determining, based at least in part on the sensor data, a number of additional pedestrians proximate the vehicle; determining an amount of inventory; and transmitting the number and the amount to a remote system.

K: The one or more non-transitory computer-readable media of paragraph E, the operations further comprising: receiving, from a remote system, a second instruction to transition from delivery service to taxi service; and controlling, based at least in part on the second instruction, the vehicle within the environment.

L: The one or more non-transitory computer-readable media of paragraph E, further comprising one or more of: receiving payment for the item via a mobile application associated with the pedestrian; or receiving the payment for the item via an interface associated with the vehicle.

M: The one or more non-transitory computer-readable media of paragraph E, the operations further comprising: controlling, based at least in part on receiving the instruction from a remote system, the vehicle to navigate to a supply facility to retrieve the quantity of the item.

N: The one or more non-transitory computer-readable media of paragraph E, wherein the sensor data is first sensor data and the region is a first region, the operations further comprising: determining, based at least in part on the first sensor data, a first pedestrian density within the first region; determining, based at least in part on second sensor data from a second vehicle, a second pedestrian density within a second region; determining, based at least in part on comparing the first pedestrian density with the second pedestrian density, an updated dispensing strategy; and controlling, based at least in part on the updated dispensing strategy, the vehicle to deliver the quantity of the item to a second plurality of pedestrians within the second region.

O: A method comprising: receiving an instruction to deliver a quantity of an item to a region of an environment with pedestrians; receiving sensor data from within the region; detecting, based at least in part on the sensor data, a location of a pedestrian proximate a vehicle and an indication of whether the pedestrian is associated with the item;

determining, based at least in part on the location and the indication, a dispensing strategy for the vehicle within the region; and controlling, based at least in part on the dispensing strategy, the vehicle to deliver the item.

P: The method of paragraph O, wherein determining the dispensing strategy is based at least in part on one or more of: a density of the pedestrians; a movement of the pedestrians; zoning regulations; or a location type.

Q: The method of paragraph O, wherein the indication comprises a determination that the pedestrian is without the item, further comprising one or more of: causing speakers to output directional sound towards the pedestrian; or causing visual emitters to output directional light towards of pedestrian.

R: The method of paragraph O, wherein the sensor data is first sensor data captured at a first time, further comprising: receiving, from a sensor device, second sensor data from the vehicle within the region, wherein the second sensor data is captured at a second time after the first time; determining, based at least in part on the second sensor data, a change in the environment; determining, based at least in part on the change in the environment, an updated dispensing strategy for the vehicle within the region; and controlling, based at least in part on the updated dispensing strategy, the vehicle to deliver the quantity of the item.

S: The method of paragraph O, further comprising: receiving information from the pedestrian via a user device associated with the pedestrian, the information indicative of a request for the item, wherein controlling the vehicle to deliver the quantity of the item is further based at least in part on the information.

T: The method of paragraph O, further comprising: determining, based at least in part on the sensor data, a number of additional pedestrians proximate the vehicle; determining an amount of inventory; and transmitting the number and the amount to a remote system.

U: A system comprising: one or more processors; and one or more non-transitory computer-readable media storing computer-executable instructions that, when executed, cause the one or more processors to perform operations comprising: receiving, from a sensor device associated with a first vehicle of a fleet of vehicles, sensor data associated with an environment; determining, based at least in part on the sensor data, a region within the environment associated with a threshold number of pedestrians; determining a number of vehicles available for delivery service; determining an item to deliver to the pedestrians within the region; determining a second vehicle of the fleet of vehicles to deliver a quantity of the item to the pedestrians within the region; and causing instructions to be sent to the second vehicle to transport the quantity of the item to the pedestrians within the region.

V: The system of paragraph U, wherein determining the number of vehicles available for delivery service comprises: receiving forecast data associated with the region; determining, based at least in part on historical data, the sensor data, and the forecast data, a first predicted demand for taxi service vehicles and a second predicted demand for delivery service vehicles; and determining, based at least in part on comparing the first predicted demand with the second predicted demand, the number of vehicles available for delivery service.

W: The system of paragraph U, wherein the sensor data is first sensor data, the operations further comprising: receiving, from the sensor device associated with the second vehicle of the fleet of vehicles, second sensor data associated with the environment; determining, based at least in part on the first sensor data, a first density of the pedestrians; determining, based at least in part on the second sensor data, a second density of second pedestrians; and causing, based at least in part on the second density being greater than the first density, instructions to be sent to the first vehicle to move to a location associated with the second vehicle.

X: The system of paragraph U, the operations further comprising: receiving a request from a user for the item, wherein determining the region is further based at least in part on the request.

Y: One or more non-transitory computer-readable media storing instructions executable by one or more processors, wherein the instructions, when executed, cause the one or more processors to perform operations comprising: receiving sensor data associated with an environment; determining, based at least in part on the sensor data, a region within the environment associated with a threshold number of pedestrians; determining a number of vehicles of a fleet of vehicles that are available for delivery service; determining a vehicle of the fleet of vehicles to deliver a quantity of an item to the pedestrians within the region; and causing instructions to be sent to the vehicle to transport the quantity of the item to the pedestrians within the region.

Z: The one or more non-transitory computer-readable media of paragraph Y, wherein determining the number of vehicles available for delivery service comprises: receiving forecast data associated with the region; determining, based at least in part on the sensor data and the forecast data, a first predicted demand for taxi service vehicles and a second predicted demand for delivery service vehicles; and determining, based at least in part on comparing the first predicted demand with the second predicted demand, the number of vehicles available for delivery service.

AA: The one or more non-transitory computer-readable media of paragraph Z, the operations further comprising: causing, based at least in part on the number of vehicles available for delivery service, at least a portion of the fleet of vehicles to transition to delivery service.

AB: The one or more non-transitory computer-readable media of paragraph Y, wherein the sensor data is first sensor data captured at a first time, the operations further comprising: receiving, from a sensor device associated with the vehicle of the fleet of vehicles, second sensor data associated with the environment; determining, based at least in part on the first sensor data, a first density of the pedestrians; determining, based at least in part on the second sensor data, a second density of second pedestrians; and causing, based at least in part on the second density being greater than the first density, instructions to be sent to the vehicle to move to a location associated with the vehicle.

AC: The one or more non-transitory computer-readable media of paragraph Y, the operations further comprising: receiving a request from a user for the item, wherein determining the region is further based at least in part on the request.

AD: The one or more non-transitory computer-readable media of paragraph Y, the operations further comprising: determining that a second vehicle is delivering an additional quantity of the item to the pedestrians within the region; receiving delivery data associated with region; and determining, based at least in part on the sensor data and the delivery data, a spacing of the vehicle and the second vehicle within the region.

AE: The one or more non-transitory computer-readable media of paragraph Y, wherein the number of vehicles available for delivery service is further based at least in part on historical data, wherein historical data comprises at least one of: a density of the pedestrians within the region; a first number of the pedestrians within the region; a first pattern of traffic for a time of day within the region; a second pattern of traffic for the time of week within the region; a second number of previous sales within the region; or an amount of application use within the region, wherein the application is a mobile application.

AF: The one or more non-transitory computer-readable media of paragraph Y, the operations further comprising: receiving an indication of a quantity of the item remaining in the vehicle; determining that the quantity of the item remaining is below a threshold quantity; and causing, based at least in part on the quantity of the item remaining being below the threshold quantity, second instructions to be sent to the vehicle to restock the vehicle with an additional quantity of the item.

AG: The one or more non-transitory computer-readable media of paragraph Y, wherein the instructions comprise: causing, based at least in part on causing the instructions to be sent to the vehicle, the vehicle to retrieve the quantity of the item from a facility; and causing, based at least in part on the vehicle retrieving the quantity of the item, the vehicle to transport the quantity of the item to pedestrians within the region.

AH: The one or more non-transitory computer-readable media of paragraph Y, wherein determining the region within the environment associated with the threshold number of pedestrians is further based on receiving, from a mobile application, a request for the item.

AI: The one or more non-transitory computer-readable media of paragraph Y, wherein the item to deliver is determined based at least in on at least one of: the sensor data of the vehicle within the environment, historical data associated with the region, forecast data associated with the region, location data of the region within the environment, or user input from users via a mobile application.

AJ: A method comprising: receiving sensor data associated with an environment; determining, based at least in part on the sensor data, a region within the environment associated with a threshold number of pedestrians; determining a number of vehicles of a fleet of vehicles that are available for delivery service; determining a vehicle of the fleet of vehicles to deliver a quantity of an item to the pedestrians within the region; and causing instructions to be sent to the vehicle to transport the quantity of the item to the pedestrians within the region.

AK: The method of paragraph AJ, wherein determining the number of vehicles available for delivery service comprises: receiving forecast data associated with the region; determining, based at least in part on the sensor data and the forecast data, a first predicted demand for taxi service vehicles and a second predicted demand for delivery service vehicles; and determining, based at least in part on comparing the first predicted demand with the second predicted demand, the number of vehicles available for delivery service.

AL: The method of paragraph AJ, wherein the sensor data is first sensor data captured at a first time, further comprising: receiving, from a sensor device associated with the vehicle of the fleet of vehicles, second sensor data associated with the environment; determining, based at least in part on the first sensor data, a first density of the pedestrians; determining, based at least in part on the second sensor data, a second density of second pedestrians; and causing, based at least in part on the second density being greater than the first density, instructions to be sent to the vehicle to move to a location associated with the vehicle.

AM: The method of paragraph AJ, further comprising: receiving a request from a user for the item, wherein determining the region is further based at least in part on the request.

AN: The method of paragraph AJ, further comprising: determining that a second vehicle is delivering an additional quantity of the item to the pedestrians within the region; receiving delivery data associated with region; and determining, based at least in part on the sensor data and the delivery data, a spacing of the vehicle and the second vehicle within the region.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the one or more processors to perform operations comprising:
   receiving, from a sensor device associated with a first autonomous vehicle of a fleet of vehicles, sensor data associated with an environment;
   determining, based at least in part on the sensor data, a region within the environment associated with a threshold number of pedestrians;
   determining a number of vehicles available for delivery service;
   determining an item to deliver to the pedestrians within the region;
   determining a second autonomous vehicle of the fleet of vehicles to deliver a quantity of the item to the pedestrians within the region; and
   causing instructions to be sent to the second autonomous vehicle to transport the quantity of the item to the pedestrians within the region, wherein the second autonomous vehicle is moved to the pedestrians to transport the quantity of the item within the region based at least in part on the instructions.

2. The system of claim 1, wherein determining the number of vehicles available for delivery service comprises:
   receiving forecast data associated with the region;
   determining, based at least in part on historical data, the sensor data, and the forecast data, a first predicted demand for taxi service vehicles and a second predicted demand for delivery service vehicles; and
   determining, based at least in part on comparing the first predicted demand with the second predicted demand, the number of vehicles available for delivery service.

3. The system of claim 1, wherein the sensor data is first sensor data, the operations further comprising:
   receiving, from the sensor device associated with the second autonomous vehicle of the fleet of vehicles, second sensor data associated with the environment;
   determining, based at least in part on the first sensor data, a first density of the pedestrians;
   determining, based at least in part on the second sensor data, a second density of second pedestrians; and
   causing, based at least in part on the second density being greater than the first density, instructions to be sent to the first autonomous vehicle to move to a location associated with the second autonomous vehicle.

4. The system of claim 1, the operations further comprising:
   receiving a request from a user for the item,
   wherein determining the region is further based at least in part on the request.

5. One or more non transitory computer readable media storing instructions executable by one or more processors, wherein the instructions, when executed, cause the one or more processors to perform operations comprising:
   receiving sensor data associated with an environment;
   determining, based at least in part on the sensor data, a region within the environment associated with a threshold number of pedestrians;
   determining a number of vehicles of a fleet of vehicles that are available for delivery service;
   determining an autonomous vehicle of the fleet of vehicles to deliver a quantity of an item to the pedestrians within the region; and
   causing instructions to be sent to the autonomous vehicle to transport the quantity of the item to the pedestrians within the region, wherein the autonomous vehicle is moved to the pedestrians to transport the quantity of the item within the region based at least in part on the instructions.

6. The one or more non transitory computer readable media of claim 5, wherein determining the number of vehicles available for delivery service comprises:
   receiving forecast data associated with the region;
   determining, based at least in part on the sensor data and the forecast data, a first predicted demand for taxi service vehicles and a second predicted demand for delivery service vehicles; and
   determining, based at least in part on comparing the first predicted demand with the second predicted demand, the number of vehicles available for delivery service.

7. The one or more non transitory computer readable media of claim 6, the operations further comprising:
   causing, based at least in part on the number of vehicles available for delivery service, at least a portion of the fleet of vehicles to transition to delivery service.

8. The one or more non transitory computer readable media of claim 5, wherein the sensor data is first sensor data captured at a first time, the operations further comprising:
   receiving, from a sensor device associated with the autonomous vehicle of the fleet of vehicles, second sensor data associated with the environment;
   determining, based at least in part on the first sensor data, a first density of the pedestrians;
   determining, based at least in part on the second sensor data, a second density of second pedestrians; and
   causing, based at least in part on the second density being greater than the first density, instructions to be sent to a second autonomous vehicle to move to a location associated with the autonomous vehicle.

9. The one or more non transitory computer readable media of claim 5, the operations further comprising:
    receiving a request from a user for the item, wherein determining the region is further based at least in part on the request.

10. The one or more non transitory computer readable media of claim 5, the operations further comprising:
    determining that a second autonomous vehicle is delivering an additional quantity of the item to the pedestrians within the region;
    receiving delivery data associated with region; and
    determining, based at least in part on the sensor data and the delivery data, a spacing of the autonomous vehicle and the second autonomous vehicle within the region.

11. The one or more non transitory computer readable media of claim 5, wherein the number of vehicles available for delivery service is further based at least in part on historical data, wherein historical data comprises at least one of:
    a density of the pedestrians within the region;
    a first number of the pedestrians within the region;
    a first pattern of traffic for a time of day within the region;
    a second pattern of traffic for the time of week within the region;
    a second number of previous sales within the region; or
    an amount of application use within the region, wherein the application is a mobile application.

12. The one or more non transitory computer readable media of claim 5, the operations further comprising:
    receiving an indication of a quantity of the item remaining in the autonomous vehicle;
    determining that the quantity of the item remaining is below a threshold quantity; and
    causing, based at least in part on the quantity of the item remaining being below the threshold quantity, second instructions to be sent to the autonomous vehicle to restock the autonomous vehicle with an additional quantity of the item.

13. The one or more non transitory computer readable media of claim 5, wherein the instructions comprise:
    causing, based at least in part on causing the instructions to be sent to the autonomous vehicle, the autonomous vehicle to retrieve the quantity of the item from a facility; and
    causing, based at least in part on the autonomous vehicle retrieving the quantity of the item, the autonomous vehicle to transport the quantity of the item to pedestrians within the region.

14. The one or more non transitory computer readable media of claim 5, wherein determining the region within the environment associated with the threshold number of pedestrians is further based on receiving, from a mobile application, a request for the item.

15. The one or more non transitory computer readable media of claim 5, wherein the item to deliver is determined based at least in on at least one of:
    the sensor data of the autonomous vehicle within the environment,
    historical data associated with the region,
    forecast data associated with the region,
    location data of the region within the environment, or
    user input from users via a mobile application.

16. A method comprising:
    receiving sensor data associated with an environment;
    determining, based at least in part on the sensor data, a region within the environment associated with a threshold number of pedestrians;
    determining a number of vehicles of a fleet of vehicles that are available for delivery service;
    determining an autonomous vehicle of the fleet of vehicles to deliver a quantity of an item to the pedestrians within the region; and
    causing instructions to be sent to the autonomous vehicle to transport the quantity of the item to the pedestrians within the region, wherein the autonomous vehicle is moved to the pedestrians to transport the quantity of the item within the region based at least in part on the instructions.

17. The method of claim 16, wherein determining the number of vehicles available for delivery service comprises:
    receiving forecast data associated with the region;
    determining, based at least in part on the sensor data and the forecast data, a first predicted demand for taxi service vehicles and a second predicted demand for delivery service vehicles; and
    determining, based at least in part on comparing the first predicted demand with the second predicted demand, the number of vehicles available for delivery service.

18. The method of claim 16, wherein the sensor data is first sensor data captured at a first time, further comprising:
    receiving, from a sensor device associated with the autonomous vehicle of the fleet of vehicles, second sensor data associated with the environment;
    determining, based at least in part on the first sensor data, a first density of the pedestrians;
    determining, based at least in part on the second sensor data, a second density of second pedestrians; and
    causing, based at least in part on the second density being greater than the first density, instructions to be sent to a second autonomous vehicle to move to a location associated with the autonomous vehicle.

19. The method of claim 16, further comprising:
    receiving a request from a user for the item, wherein determining the region is further based at least in part on the request.

20. The method of claim 16, further comprising:
    determining that a second autonomous vehicle is delivering an additional quantity of the item to the pedestrians within the region;
    receiving delivery data associated with region; and
    determining, based at least in part on the sensor data and the delivery data, a spacing of the autonomous vehicle and the second autonomous vehicle within the region.

* * * * *